(12) United States Patent
Miyashita et al.

(10) Patent No.: US 6,381,236 B1
(45) Date of Patent: Apr. 30, 2002

(54) BI-DIRECTIONAL DIGITAL TRANSMISSION SYSTEM AND BI-DIRECTIONAL DIGITAL TRANSMISSION METHOD

(75) Inventors: Atsushi Miyashita; Toshiyuki Akiyama, both of Tokorozawa; Nobuo Tsukamoto, Akishima, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,602

(22) Filed: Jan. 26, 1999

(30) Foreign Application Priority Data

Jan. 29, 1998 (JP) .......................................... 10-015307

(51) Int. Cl.⁷ ................................................ H04J 1/00
(52) U.S. Cl. .......................... 370/343; 370/465; 348/14; 348/212
(58) Field of Search ................................ 370/343, 345, 370/464, 465, 474, 527, 529, 533, 536, 538, 542, 543; 455/450, 452; 375/295, 316, 300, 302; 348/14, 13, 212, 222, 17

(56) References Cited

U.S. PATENT DOCUMENTS

| | | | | |
|---|---|---|---|---|
| 5,408,261 A | * | 4/1995 | Kamata | 348/14.09 |
| 5,729,282 A | * | 3/1998 | Okawa | 348/14.12 |
| 5,821,995 A | * | 10/1998 | Mishikawa | 370/433 |
| 5,978,651 A | * | 11/1999 | Eto | 375/240.01 |
| 6,009,305 A | * | 12/1999 | Murata | 725/114 |
| 6,069,898 A | * | 5/2000 | Nakatsugawa | 370/474 |

* cited by examiner

*Primary Examiner*—Douglas Olms
*Assistant Examiner*—Ricardo M. Pizarro
(74) *Attorney, Agent, or Firm*—Antonelli, Terry, Stout & Kraus, LLP

(57) ABSTRACT

A bi-directional digital transmission method, and system, for sending and receiving digital transmission signals having a frame configuration modulated by an orthogonal frequency division multiplex modulation scheme. A first sending unit in a first transmission station converts first continuous data to a up-direction intermittent transmission signal, and sends it from a first antenna via a first switchover unit. The up-direction intermittent transmission signal is received by a second antenna of a second transmission station, and supplied to a second receiving unit of the second transmission station via a second switchover unit of the second transmission station. The second receiving unit determines whether receiving operation of the up-direction intermittent transmission signal has been established, and if so, restores the original first continuous data. A second sending unit in the second transmission station converts second continuous data to a down-direction intermittent transmission signal, and sends it from a second antenna via a second switchover unit. In the first transmission station, the down-direction intermittent sending transmission signal is received by the first antenna, and supplied to a first receiving unit via the first switchover unit to restore the original second continuous data.

16 Claims, 22 Drawing Sheets

BI-DIRECTIONAL DIGITAL TRANSMISSION SYSTEM AND BI-DIRECTIONAL DIGITAL TRANSMISSION METHOD

BACKGROUND OF THE INVENTION

The present invention relates to a bi-directional digital transmission system and a bi-directional digital transmission method, and in particular to a bi-directional digital transmission system and a bi-directional digital transmission method using an orthogonal frequency division multiplex modulation method.

For terrestrial transmission of moving picture signals, FPU (Field Pick Up) communication devices (hereafter referred to as FPU) are wide spread. In order to determine whether moving pictures of a main signal transmitted from a mobile station having a camera and so on to a base station such as a broadcasting center are transmitted correctly, a return signal for returning moving pictures received by a base station to a mobile station is in great demand in applications of mobile radio or semi-fixed radio. Actually, however, the receiving state of the moving pictures are conveyed from the base station to the mobile station by using communication means such as telephone.

SUMMARY OF THE INVENTION

A FPU capable of conducting the bi-directional transmission may be implemented by using two transmission bands. At the same time, however, there are also some problems in the implementation using such two transmission bonds.

FIG. 12 shows a configuration example of a FPU capable of conducting the bi-directional transmission devised by the present inventors.

Hereafter, the configuration and problems of the FPU capable of conducting bi-directional transmission will be described by referring to FIG. 12.

In FIG. 12, a sending control unit 21, a sending high frequency unit 25, an up-sending antenna 30, an up-receiving antenna 32, a receiving high frequency unit 27, and a receiving control unit 23 form an up-transmission system. A sending control unit 24, a sending high frequency unit 28, a sending antenna 33, a receiving antenna 31, a receiving high frequency unit 26, a receiving control unit 22 form a down-transmission system.

In operation, the sending control units 21 and 24 have the same configuration. A sending data rate is determined by a clock oscillator CK OSC. Data input to an ID terminal is subjected to digital modulation, then modulated to an IF signal having a frequency determined by a local oscillator LO OSC, and outputted. The input sending high frequency unit 25 or 28 converts the IF signal supplied from the sending control unit 21 or 24 to a specified RF frequency. The converted output is sent by the antenna 30 or 33. The receiving high frequency unit 26 or 27 receives only the RF signal of the specified frequency from the antenna 32 or 31, and converts it to an IF signal. The receiving control unit 23 or 22 demodulates the inputted received IF signal by using the frequency of the local oscillator LO VCO, and then outputs a digital signal having a rate determined by the output of the clock oscillator CK VCO. In this case, the radio wave used for the down-direction uses a frequency different from the frequency of the up-direction.

In the above-described bi-directional transmission system, there is a problem that two frequency bands are required and limited radio resources cannot be used effectively. In addition, the sending antenna and the receiving antenna of the up-transmission system and the sending antenna and the receiving antenna of the down-transmission system are required. In other words, four antennas in total are required.

Therefore, an object of the present invention is to remove these drawbacks and provide a transmission method, and transmission apparatus, using an orthogonal frequency division multiplex modulation scheme in which bi-directional transmission is conducted by using one frequency band.

Another object of the present invention is to provide a transmission method, and transmission apparatus, using an orthogonal frequency division multiplex modulation in which bi-directional transmission is conducted by using two sending/receiving antennas.

In order to achieve the above described objects, the bi-directional transmission of the present invention is based on the operation principle of conducting switchover between the up-direction transmission and down-direction transmission on the time axis, that is, carrying out up-direction transmission and down-direction transmission alternately with respect to time. In each transmission station on mobile station side and base station side, continuous data is converted to a digital signal which is modulated by an orthogonal frequency division multiplex modulation and is made up of a repetition of a signal sending period (signal carrying section) and a signal non-sending period (signal non-carrying section) that appear alternately so that the up-direction intermittent digital signal and the down-direction intermittent signal are transmitted alternately in terms of time.

In accordance with one aspect of the present invention, a bi-directional digital transmission method for sending/receiving digital transmission signals having a frame configuration modulated by an orthogonal frequency division multiplex modulation scheme between a first and a second transmission station, comprising the steps of:

controlling the first and second transmission stations so as to alternately produce a first sending period to be used by the first transmission station for transmission and a second sending period to be used by the second transmission station for transmission, the first sending period and subsequent second sending period constituting one frame;

converting first continuous data to a up-direction intermittent transmission signal of a frame configuration having a sending section and a non-sending section appearing alternately and further orthogonal-frequency-division-multiplex-modulating the up-direction intermittent transmission signal so as to send digital information in the sending section from the first transmission station during the first sending period;

converting second continuous data to a down-direction intermittent transmission signal of a frame configuration having a sending section and a non-sending section appearing alternately and further orthogonal-frequency-division-multiplex-modulating the down-direction intermittent transmission signal so as to send digital information in the sending section from the second transmission station during the second sending period;

receiving the digital information from the first transmission station by the second transmission station and restoring the original first continuous data; and receiving the digital information from the second transmission station by the first transmission station and restoring the original second continuous data.

In accordance with another aspect of the present invention, a bi-directional digital transmission system for transmitting digital transmission signals having a frame configuration modulated by an orthogonal frequency division multiplex modulation scheme includes:

a first transmission station including a first sending unit, a first receiving unit, a first switchover unit connected to an output of the first sending unit and an input of the first receiving unit, selection of either the output of the first sending unit or the input of the first receiving unit being controlled by the first sending unit, and a first sending/receiving path connected to the selected output of the first switchover unit; and a second transmission station including a second sending unit, a second receiving unit, a second switchover unit connected to an output of the second sending unit and an input of the second receiving unit, selection of either the output of the second sending unit or the input of the second receiving unit being controlled by the second receiving unit, and a second sending/receiving path connected to the selected output of the second switchover unit, wherein in the first transmission station the first sending unit converts first continuous data to a up-direction intermittent transmission signal and sends it from the first sending/receiving path via the first switchover unit during a first sending period, and in the second transmission station the second receiving unit restores the original first continuous data from the up-direction intermittent transmission signal received by the second sending/receiving path and supplied via the second switchover unit, and in the second transmission station the second sending unit converts second continuous data to a down-direction intermittent transmission signal and sends it from the second sending/receiving path via the second switchover unit during a second sending period, and in the first transmission station the first receiving unit restores the original second continuous data from the down-direction intermittent transmission signal received by the first sending/receiving path and supplied via the first switchover unit, the first and second sending periods appear alternately and repetitively.

In accordance with still another aspect of the present invention, a bi-directional digital transmission method for sending/receiving digital transmission signals having a frame configuration modulated by an orthogonal frequency division multiplex modulation scheme between a first transmission station and a second transmission station, the bi-directional digital transmission method includes the steps of:

controlling the first and second transmission stations so as to alternately produce a first sending period to be used by the first transmission station for transmission and a second sending period to be used by the second transmission station for transmission, the first sending period and subsequent second sending period constituting one frame;

converting first continuous data to a up-direction intermittent transmission signal of a frame configuration having a sending section and a non-sending section appearing alternately and further orthogonal-frequency-division-multiplex modulating the up-direction intermittent transmission signal in a first sending unit in the first transmission station so as to send digital information in the sending section from a first antenna via a first switchover unit during the first sending period;

receiving the up-direction intermittent transmission signal by a second antenna of the second transmission station;

supplying the receiving up-direction intermittent transmission signal to a second receiving unit the second transmission station via a second switchover in the second transmission station and restoring the original first continuous data;

converting second continuous data to a down-direction intermittent transmission signal of a frame configuration having a sending section and a non-sending section appearing alternately and further orthogonal-frequency-division-multiplex modulating the down-direction intermittent transmission signal by a second sending unit in the second transmission station so as to send digital information in the sending section from a second antenna via a second switchover unit during the second sending period;

receiving the down-direction intermittent transmission signal by the first antenna in the first transmission station; and supplying the received down-direction intermittent transmission signal to a first receiving unit in the first transmission station via the first switchover unit and restoring the original second continuous data from the received down-direction intermittent transmission signal.

Preferably, the clock oscillation output of the up-transmission system is used as a reference clock of the down-transmission system as well in order that the data rate of the down-transmission system may be determined by the up-transmission system.

DESCRIPTION OF THE PREFERRED EMBODIMENTS

Prior to description of embodiments of the present invention, the FPU of an orthogonal frequency division multiplex modulation scheme shown in FIG. 12 will now be described in further detail in order to help understand the present invention.

Figure 12:
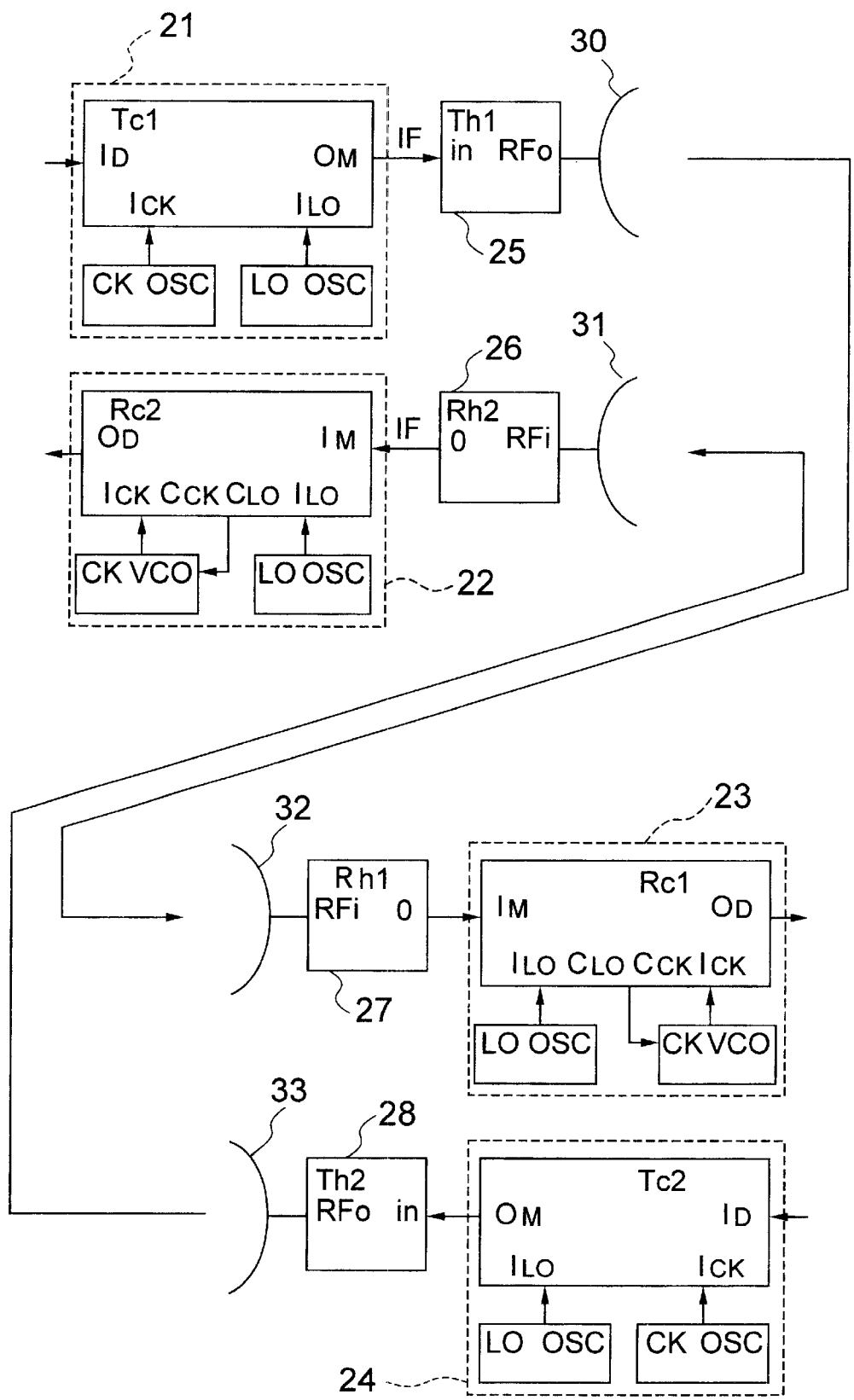
FIG. 12 is a block diagram showing an entire configuration of a conceivable bi-directional transmission system.

First of all, the sending control units 21 and 24 and the receiving control units 23 and 22 included in the FPU of FIG. 12 will hereafter be described in detail. In recent years, digital broadcasting has been studied in Europe, the United States, and Japan. As its modulation scheme, the orthogonal frequency division multiplex scheme (hereafter referred to as OFDM) is the likeliest to be adopted. The OFDM is one kind of multi-carrier modulation schemes. In the OFDM, a large number of digital modulated waves are added together.

Hereafter, an OFDM signal will be represented by equations. First of all, a QPSK signal of each carrier can be represented by equation (1).

$$\alpha_k(t) = a_k(t) \cdot \cos(2\pi k f t) + b_k(t) \cdot \sin(2\pi k f t) \quad (1)$$

In this equation, k indicates a carrier number, and $a_k(t)$ and $b_k(t)$ are data of a kth carrier, and assumes a value of [−1] or [1].

Assuming that the number of carriers is N, an OFDM signal is a combination of N carriers as represented by $$\beta(t) = \Sigma \alpha_k(t) \quad (2)$$

where k assumes a value ranging from 1 to N. For example, N is 688.

In the OFDM signal, a data sequence having, for example, 1,056 samples is called symbol, and a stream obtained by adding 4 synchronizing symbols to 396 symbols is called frame.

Figure 13:
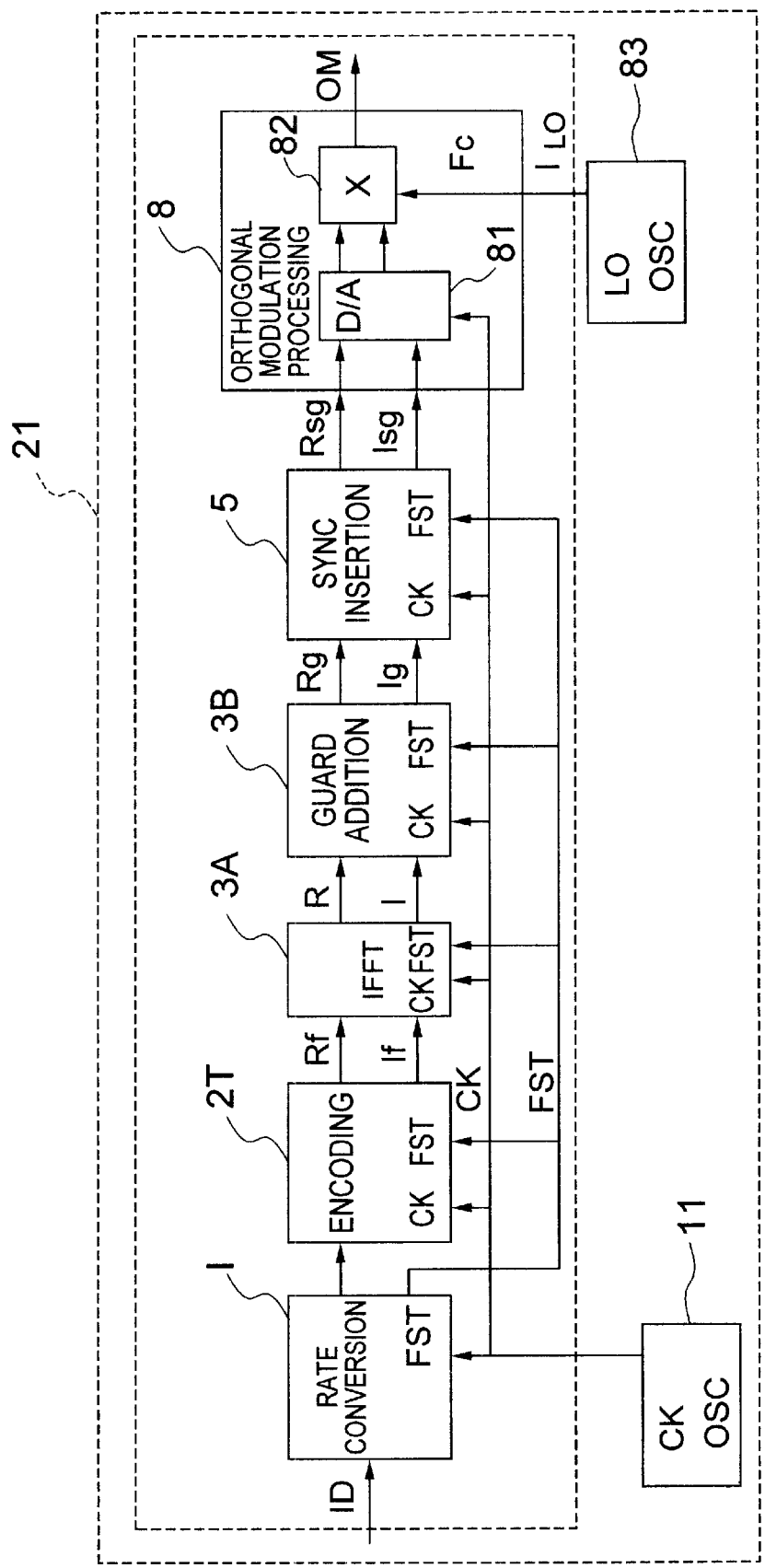
FIG. 13 is a block diagram showing an example of a configuration of a sending control unit of FIG. 12.

FIG. 13 is a block diagram of an OFDM modulation device constituting the sending control unit 21.

Hereafter, operation of the OFDM modulation device will be described. Continuously inputted data ID is subjected to rate conversion in a rate conversion unit 1 so that it is outputted from the rate conversion unit 1 every frame period having, for example, 400 symbols with 4-symbol period thereof corresponding to the synchronizing (sync) symbol period described later in further detail and 273rd to 752nd sample period in each information symbol corresponding to a blank for unnecessary carriers not carrying data. The rate conversion unit 1 outputs a FST (Frame Start) signal indicating to other units the start of the synchronizing symbol interval every frame period, i.e., every 400 symbols.

An encoding unit 2T encodes its input data, and outputs encoded data Rf and If mapped to I and Q axes.

An IFFT (Inverse Fast Fourier Transform) processing unit 3A regards the Rf and If as frequency components, and transforms them to time axis signals R and I formed of 1,024 points. A guard addition unit 3B adds a waveform of, for example, first 32 samples of a start interval waveform of R and I formed of 1,024 points to the end of 1,024 points, and outputs temporal waveforms Rg and Ig each having 1,056 samples in total. Every m information symbols, a synchronizing symbol insertion unit 5 generates and outputs signals Isg and Rsg with synchronizing symbols formed of, for example, 4 symbols inserted therein. The synchronizing symbols have been stored in a memory or the like (not shown) beforehand. The synchronizing symbol insertion unit 5 thus completes an OFDM modulated wave having a frame configuration as shown in FIG. 15.

On the sending side, inputted data to be transmitted is subjected to difference encoding, then subjected to mapping so as to be assigned to respective carriers, in the encoding unit 2T. By regarding the in-phase component I of each carrier as a real number part data and the quadrature component Q as an imaginary number part data, the IFFT processing unit 3A conducts inverse Fourier transform and generates signals in the time domain. It is a matter of course that these signals subjected to the IFFT processing take waveforms close to random noise.

The guard addition unit 3B adds parts of the signals as signals corresponding to a guard interval and thereby generates information symbols Ig and Rg.

Figure 15:
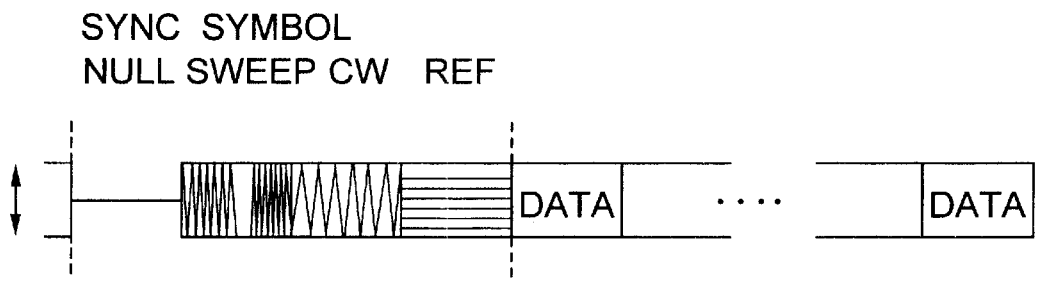
FIG. 15 is a diagram showing a frame configuration of an OFDM signal.

The sync symbol insertion unit 5 inserts synchronization waveforms, which have been stored in a memory or the like beforehand, every m information symbols, thereby generates Isg and Rsg, and completes the OFDM modulated wave having the frame configuration as shown in FIG. 15.

Details of respective units in the sending control unit 21 will now be described.

Figure 16:
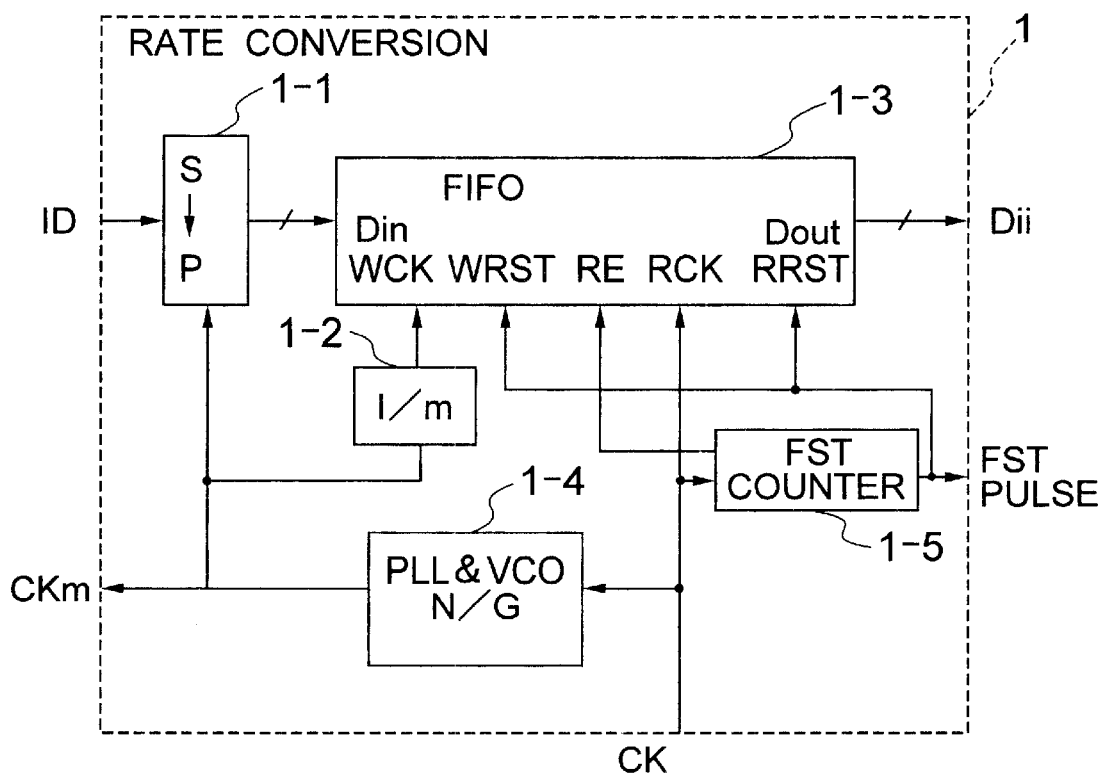
FIG. 16 is a block diagram showing a configuration of a rate conversion unit in the transmission system of FIG. 12.

A configuration example of the rate conversion unit 1 is shown in FIG. 16. An inputted clock CK is inputted to a PLL&VCO 1-4. The PLL&VCO 1-4 outputs a clock CKm which is N/G times the frequency of the inputted clock CK. Furthermore, the clock CK is inputted to a FST counter 1-5 as well so that a FST pulse functioning as a frame reference of processing of the sending side is generated and outputted. This FST pulse is inputted to WRST and RRST terminals of a FIFO 1-3, and used as reset reference. An inputted serial data ID or Din is converted to a parallel signal by a serial-parallel converter (S-P) 1-1. The parallel signal is input to the FIFO memory 1-3. The FIFO memory 1-3 is driven by an output of a 1/m frequency divider 1-2, which is provided with Ckm as its input. A parallel signal Dij is outputted from the FIFO 1-3 by a write enable signal RE supplied from a FST counter 1-5.

Figure 17:
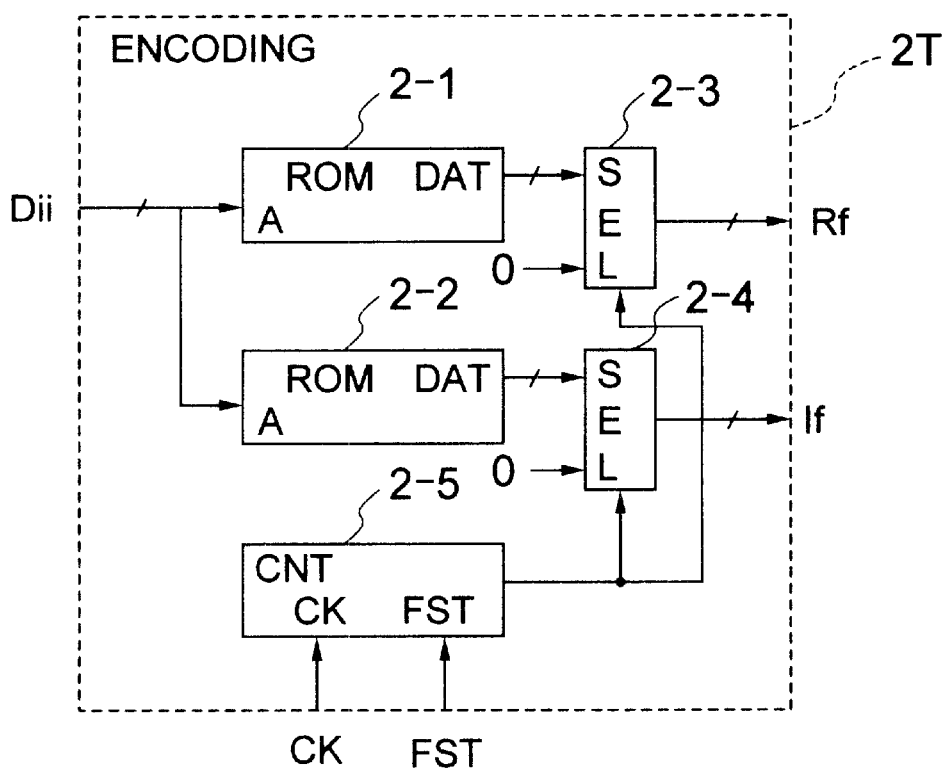
FIG. 17 is a block diagram showing a configuration of an encoding unit in the transmission system of FIG. 12.

A configuration example of the encoding unit 2T is shown in FIG. 17. The signal Dij supplied from the rate conversion unit 1 is inputted to mapping ROMs 2-1 and 2-2, and is converted to signals of predetermined points on the I and Q axes. The signals in the interval corresponding to the above described unnecessary carrier is replaced by 0 in selectors (SEL) 2-3 and 2-4. As a result, Rf and If are generated. The SEL 2-3 and 2-4 are controlled by a controller 2-5 which is determined in timing by the clock CK and the FST pulse.

Figure 18:
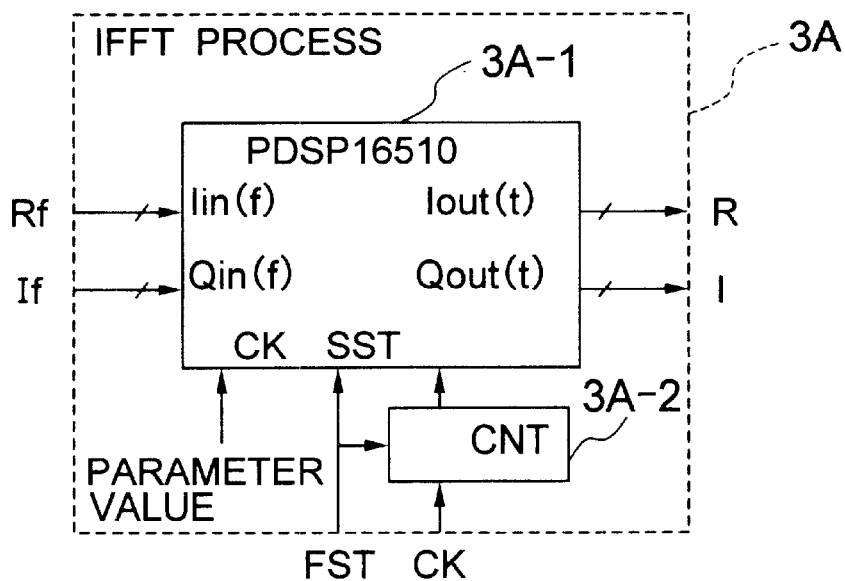
FIG. 18 is a block diagram showing a configuration of an IFFT processing unit in the transmission system of FIG. 12.

A configuration example of the IFFT processing unit 3A is shown in FIG. 18. Using the signal FST of a symbol period including the above described guard interval as a reference, the input signals Rf and If are transformed to time domain signals R and I by a controller (CNT) 3A-2, which is determined in timing by the CK and FST. To be concrete, it may be implemented by using an existing technique such as PDSP 16510 of MITEL SEMICONDUCTOR (formerly GEC PLESSEY SEMICONDUCTOR). While detailed description of the IFFT processing unit 3A will be omitted, any configuration may be used so long as the functions of the equations (1) and (2) can be implemented.

Figure 19:
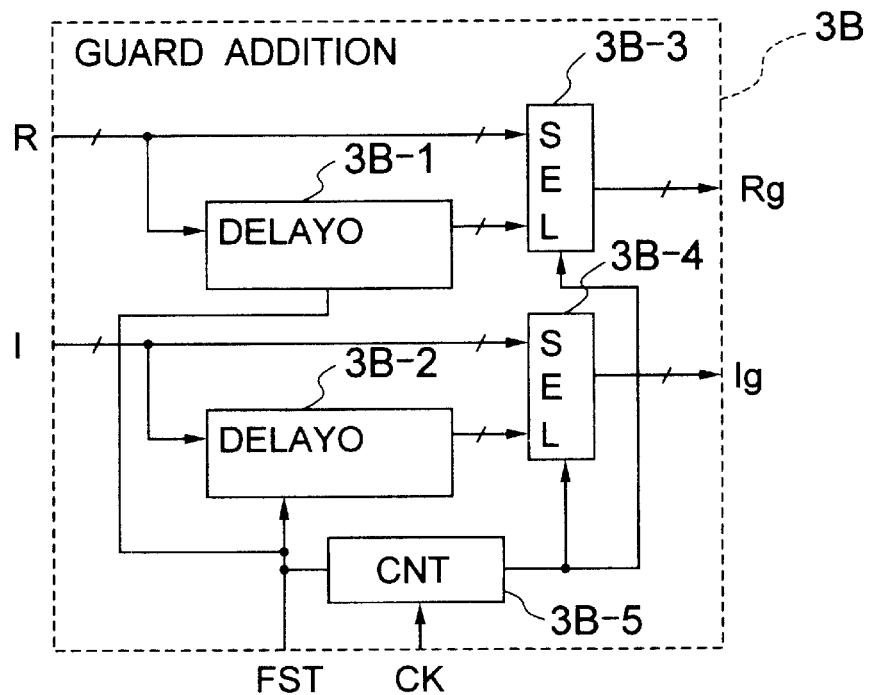
FIG. 19 is a block diagram showing a configuration of a guard addition unit in the transmission system of FIG. 12.

A configuration example of the guard addition unit 3B is shown in FIG. 19. Inputted signals R and I are inputted to delay units (DELAY0) 3B-1 and 3B-2, respectively, for delaying inputted signals R and I by 1024 samples, and the delayed signals R and I are fed to selection units SEL 3B-3 and 3B-4, respectively. The selection units SEL 3B-3 and 3B-4 switches to select the outputs of the delay units 3B-1 and 3B-2 during 1,025th to 1,056th samples.

As a result, a symbol having a total of 1,056 samples outputted from the guard addition unit has a temporal waveform between the 1st to 32nd samples inserted in the 1,025th sample to 1,056th samples. The SEL 3B-3 and 3B-4 are controlled by a controller (CNT) 3B-5 determined in timing by the clock CK and the FST pulse.

Figure 20:
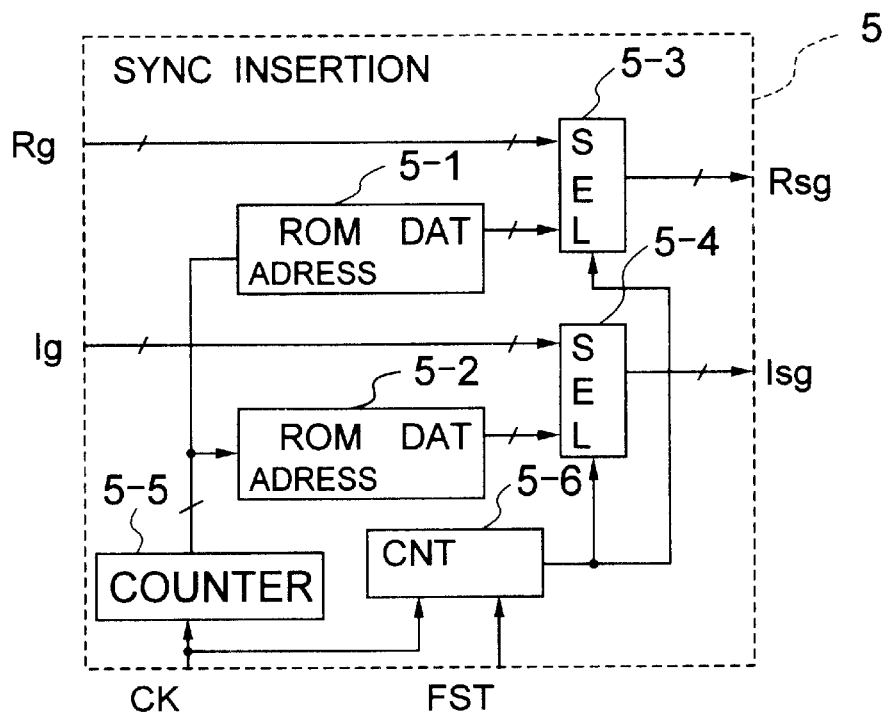
FIG. 20 is a block diagram showing a configuration of a sync insertion unit in the transmission system of FIG. 12.

A configuration example of the sync insertion unit 5 is shown in FIG. 20. ROMs 5-1 and 5-2 controlled by a counter 5-5, which is determined in terms of timing by the clock CK and the FST pulse, generate sync symbol signals at timing according to the FST pulse. Selectors (SEL) 5-3 and 5-4 controlled by a controller (CNT) 5-6, which is determined in terms of timing by the clock CK and the FST pulse, switches over to sync symbol signals supplied from ROMs 5-1 and 5-2 only during the 1st to 4th symbol interval of the generated temporal signals Rg and Ig with guard, which is currently no signal (NULL) interval (i.e., on the input side of the sync insertion unit 5). An object of the NULL insertion is to roughly find the existence of the sync symbols having no signals. During the NULL symbol interval, any signals are not outputted at all. An object of the SWEEP symbol insertion is to find the symbol switchover point accurately. The SWEEP symbol has a waveform changing from a lower limit frequency of a transmission band to its upper limit frequency during one symbol interval.

With reference to FIG. 13, an orthogonal modulation processing unit 8 includes a D/A converter 81, an orthogonal modulator 82, and a local oscillator 83. D/A conversion of a real number part signal Rsg and an imaginary number part signal Isg is conducted by the D/A converter 81. In the orthogonal modulator 82, orthogonal modulation is conducted on the real number part signal by using a carrier signal of a frequency fc supplied from the oscillator 83, and on the imaginary part signal by using a signal obtained by shifting the phase of the carrier signal of a frequency fc by 90°. These signals are combined to generate an OFDM signal.

Figure 14:
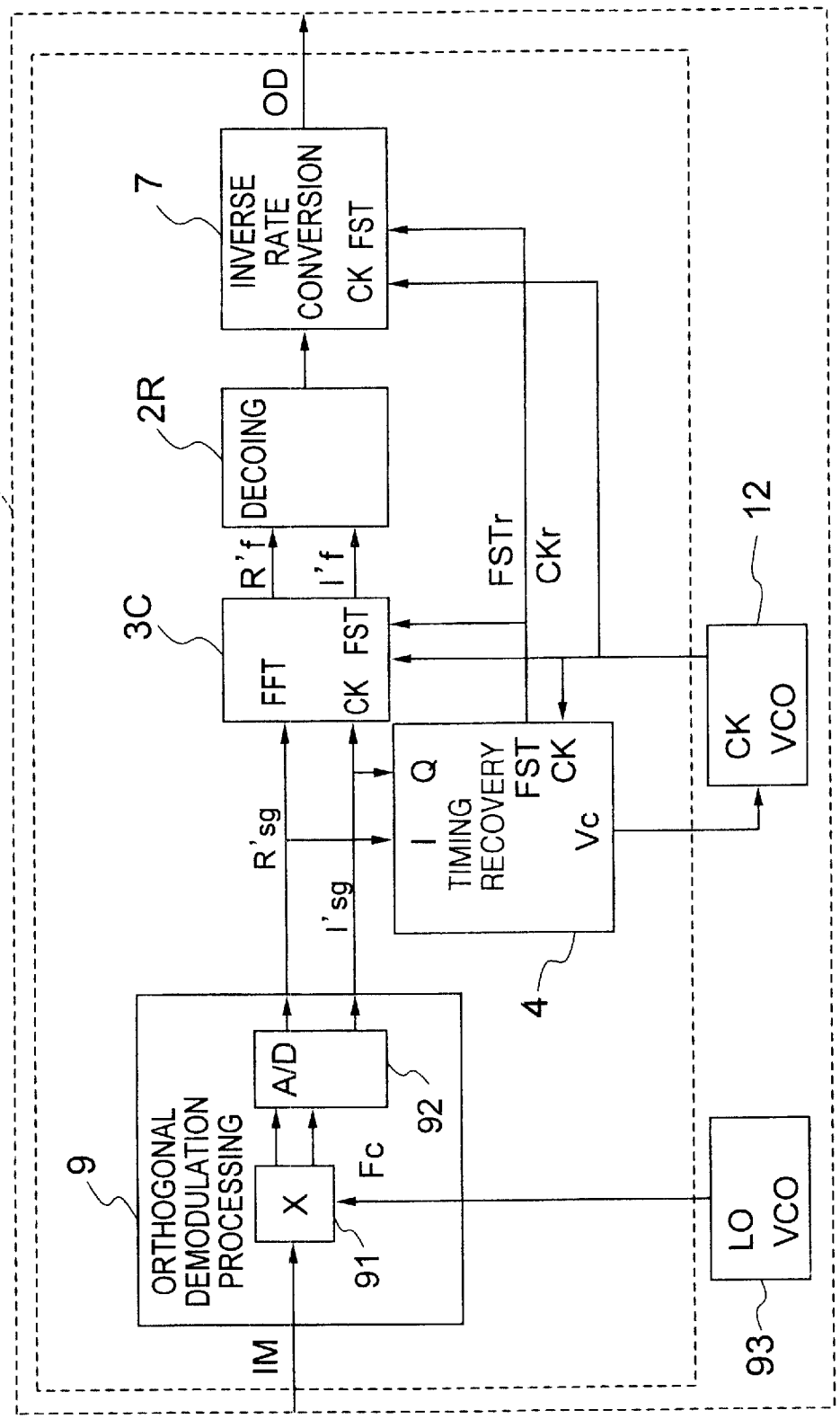
FIG. 14 is a block diagram showing an example of a configuration of a receiving control unit in the transmission system of FIG. 12.

Hereafter, configuration and operation of the receiving side of the up-transmission system will be described. FIG. 14 is a block diagram of an OFDM demodulation device which constitutes the receiving control unit 23.

On the receiving side, a transmitted frame composition signal IM is inputted to an orthogonal demodulation processing unit 9. Contrary to the sending side, the orthogonal demodulation processing unit 9 takes out a signal demodulated in an orthogonal demodulator 91 by using a carrier signal of a voltage controlled local oscillator 93, as a real number part signal, and takes out a signal demodulated by using the carrier signal shifted in phase by 90°, as an imaginary number part signal. Demodulated analog signals of the real number part and the imaginary number part are converted to digital signals by an A/D converter 92.

Figure 21:
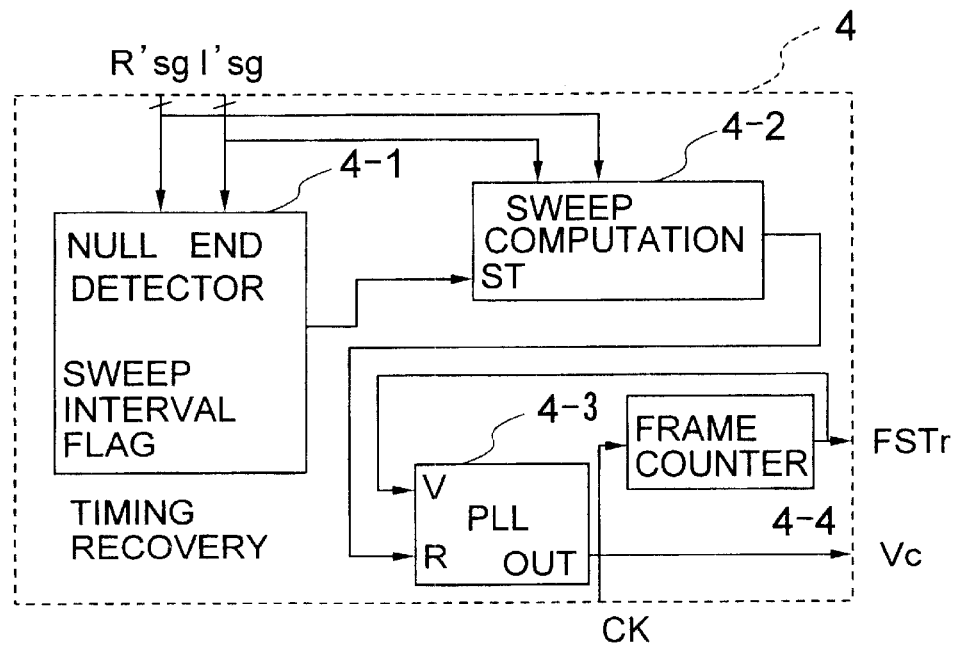
FIG. 21 is a block diagram showing a configuration of a timing recovery unit in the transmission system of FIG. 12.

A configuration example of a timing recovery unit 4 is shown in FIG. 21.

Orthogonal demodulated digital signals R'sg and I'sg are inputted to a NULL end detector 4-1 and a sweep computation unit 4-2. The NULL end detector 4-1 detects NULL forming the no-signal state from among the sync symbols, detects the rough position of the sync symbols, estimates the SWEEP symbol start time in a timer circuit (not shown) on the basis of the NULL end time, and outputs a SWEEP interval indication pulse. In the SWEEP symbol existing after the NULL symbol, the SWEEP computation unit 4-2 searches for accurate switchover timing of each symbol by referring to the SWEEP interval indication pulse. To be concrete, the SWEEP computation unit 4-2 stores a pattern of the SWEEP symbol in its internal memory beforehand, conducts correlation computation between the inputted OFDM signal and the signal stored in the memory, and outputs a coincidence pulse when the signal pattern of the memory has coincided with the pattern of the OFDM signal. This coincidence pulse is inputted to an R terminal of a phase comparator (PLL) 4-3.

As for the timing recovery of the OFDM signal, see prior application, U.S. Ser. No. 09/096454, entitled "DATA TRANSMISSION APPARATUS AND RECEIVING APPARATUS USING ORTHOGONAL FREQUENCY DIVISION MULTIPLEX MODULATION SYSTEM," filed on Jun. 11, 1998 and assigned to the present assignee, and another prior application filed on Dec. 2, 1998 (Application Number yet to be assigned), priority-claimed on the basis of Japanese Patent Application No. 9-332855 filed on Dec. 3, 1997, entitled "SYNCHRONIZATION DETECTION METHOD FOR DATA TRANSMISSION APPARATUS AND DATA TRANSMISSION APPARATUS USING THE SAME," and assigned to the present assignee. The disclosures of the prior U.S. applications are hereby incorporated by reference.

When the count of CK has reached a value forming the frame period (for example, 1056×400), a frame counter 4-4 shown in FIG. 21 returns its value to 0, outputs a FSTr pulse, and then counts CK again. Thereafter, the FSTr pulse is outputted repetitively to indicate the frame start time every frame start point. This FSTr pulse is inputted to a V terminal of the phase comparator 4-3. The phase comparator 4-3. outputs a control voltage Vc for a VCO 12 (FIG. 14) according to a phase difference between an R terminal and a V terminal. This Vc compares a periodic difference between the period of the coincidence pulse and the period of the FSTr caused by a difference between the sending side clock frequency and the receiving side clock frequency, and controls the clock frequency of the receiving side.

The OFDM demodulation device 23 on the receiving side uses the FSTr pulse generated from this clock frequency as start timing of Fast Fourier transform, decoding, and inverse rate conversion.

In FIG. 14, a FFT processing unit 3C partitions symbols on the basis of the FSTr pulse, conducts Fourier transform, thereby conducts OFDM demodulation, and outputs signals R'f and I'f.

In FIG. 14, a decoding unit 2R discriminates the signals R'f and I'f by using, for example, a ROM table technique, and calculates a signal D'o.

In FIG. 14, an inverse rate conversion unit 7 is determined in operation timing by the clock CKr and the FSTr pulse, and has a reverse configuration with respect to the rate conversion unit 1.

Figure 22:
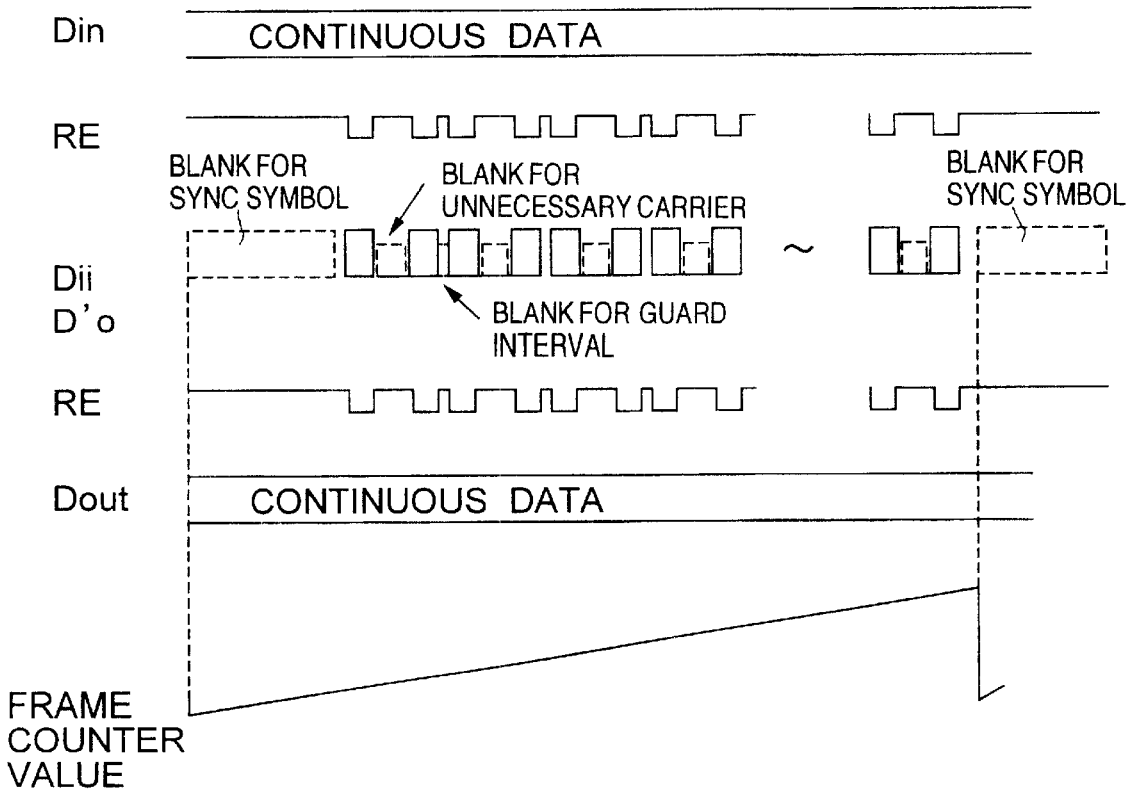
FIG. 22 is a conceptual diagram of transmission signal generation in the transmission system of FIG. 12.

FIG. 22 is a time chart showing the concept of the processing.

Hereafter, embodiments of the present invention will be described by referring to the drawing. Throughout all drawing, the same components are denoted by like numerals.

Figure 1:
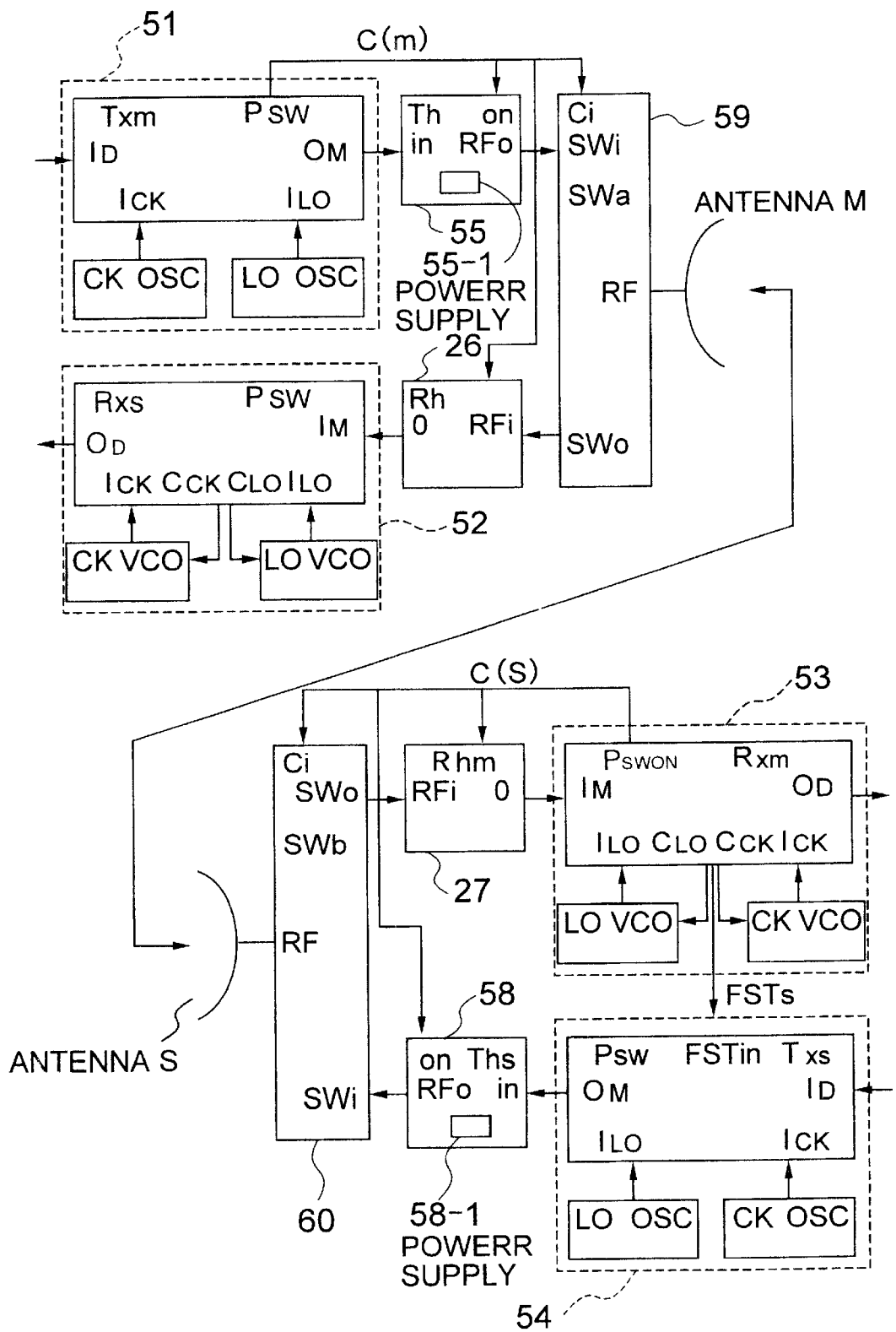
FIG. 1 is a block diagram showing an entire configuration of an embodiment of a bi-directional transmission system according to the present invention.
Figure 2:
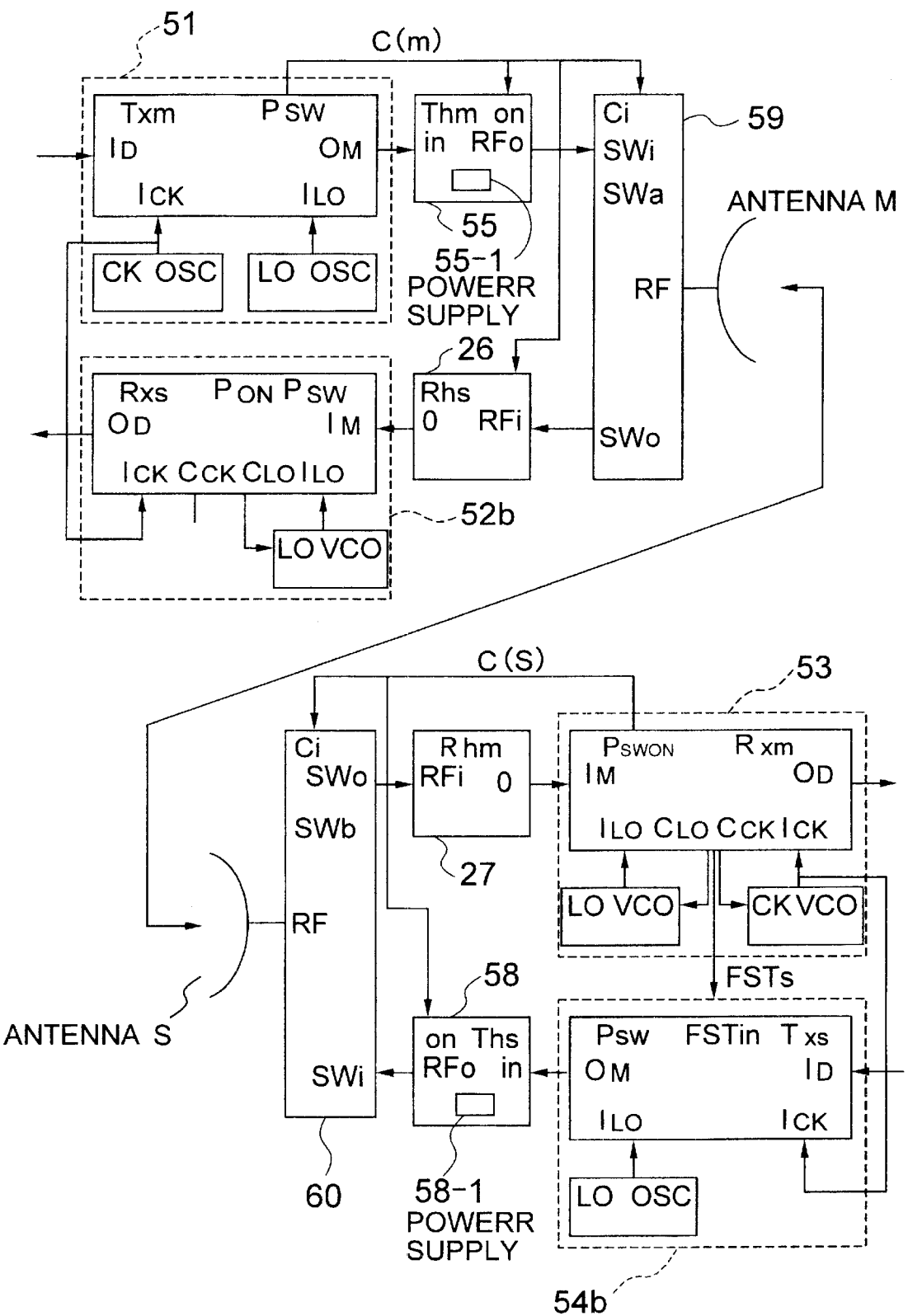
FIG. 2 is a block diagram showing an entire configuration of an embodiment of a bi-directional transmission system according to the present invention.
Figure 3:
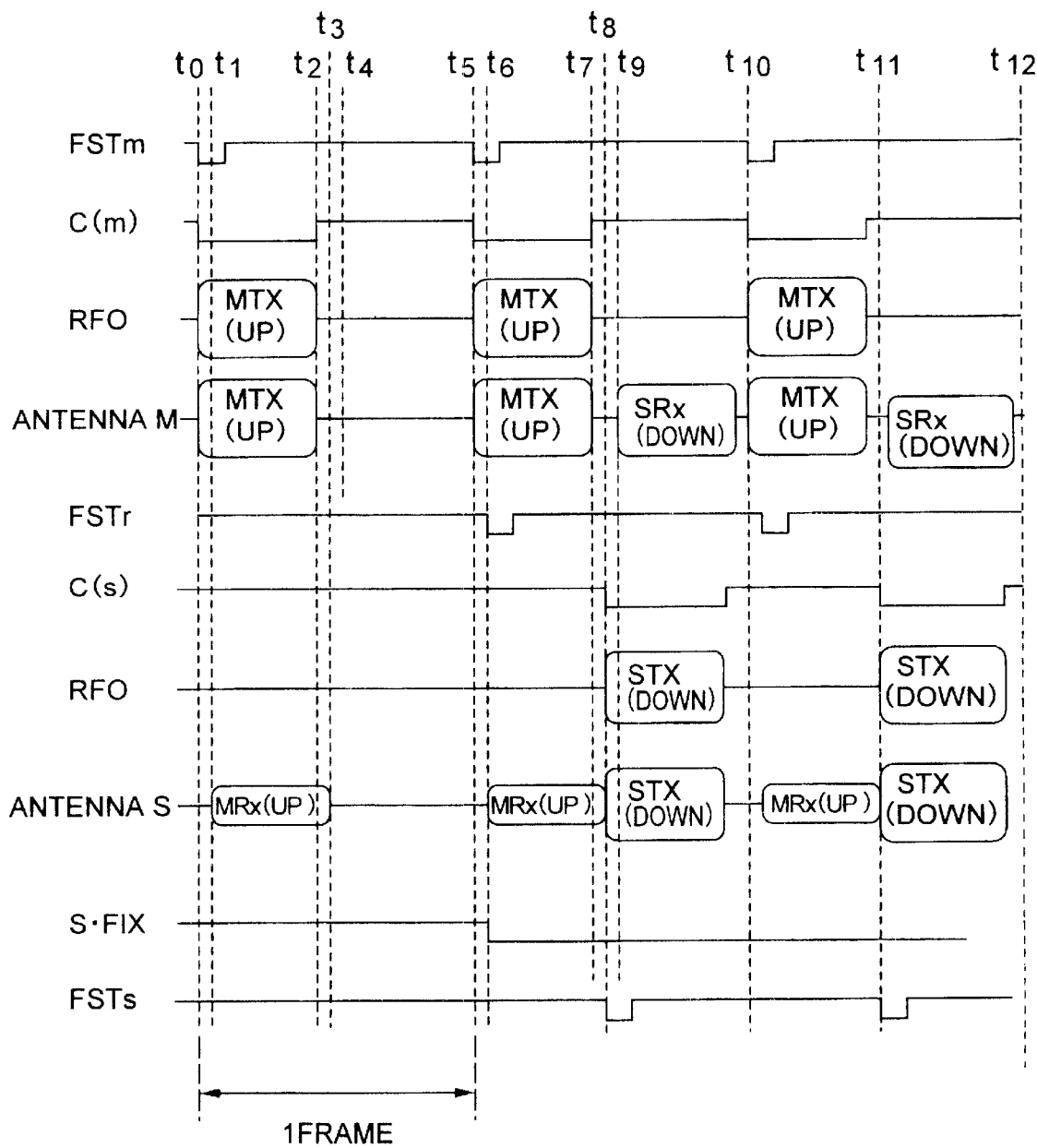
FIG. 3 is a time chart useful for description of operation of the present invention.

FIGS. 1 and 2 are block diagrams showing configurations of first and second embodiments of the present invention, respectively. FIG. 3 is a waveform diagram for description of operations of bi-directional transmission systems of these embodiments.

Briefly, the operation of the bi-directional transmission using one transmission band is such that a transmission channel from a mobile station to a base station (hereafter referred to as up-channel) and transmission channel from the base station side to the mobile station side (hereafter referred to as down-channel) are temporally switched over alternately for transmission as shown in FIGS. 1 through 3. Bi-directional transmission is conducted by using the same predetermined frequency band. More specifically, as shown in FIG. 3, transmission signals on respective up-channel and down-channel are transmitted alternately with respect to time such that continuous data to be transmitted on up-channel and down-channel are converted to up-direction intermittent digital signal and down-direction intermittent digital signal, respectively, which each consist of a signal sending period (t0–t3, ... in up-direction and t8–t10, ... in down-direction) including a group of a plurality of kinds of sync symbols and a plurality of information (data) symbols and a signal non-sending period (t3–t5, ... in up-direction and t10–t11, ... in down-direction), the up-direction period and the down-direction signal alternately appearing. For a sending interval lasting from time t0 to t2, t5 to t7, ... , a control signal C(m) is set to a low level so that a power supply 55-1 of a sending high frequency unit (Th) 55 for a power stage (not shown) may be turned on so as to operate the power stage. In addition, SWi of an RF switchover unit (SWa) 59 forming a sending/receiving switchover unit is selected. As a result, a high frequency signal MTX is intermittently sent from an antenna M as an up-direction transmission signal. Due to the delay caused by the propagation, the high frequency signal MTX arrives at an antenna S of the base station as MRX in an interval lasting from t1 to t3. Intervals lasting from t2 to t5, t7 to t10, ... are signal non-sending intervals of the up-channel during which no signals are sent.

Initially, in such a state that receiving synchronization is not yet established, a control signal C(s) is always kept at a high level on the base station side, so that the receiving state is maintained. During an interval lasting from t3 to t5, the mobile station side waits to receive data on the down-channel. And when one frame period has elapsed from the beginning, the sending side sends the next transmission signal from the antenna M during an interval t5 to t7. On the base station side, when receiving synchronization is established after time t6, thereby producing a FSTr signal and turning a S·FIX signal to a low level, a FSTs signal indicating that the receiving operation of the up-channel has been established is sent to a sending controller (Txs) 54 of the down-channel. Furthermore, at times t8, t11, . . . when the received high frequency signal MRx (up) is stopped temporarily, the control signal C(s) is set to a low level (L).

The sending control unit (Txs) 54 of the base station side turns on a power supply 58-1 for a power stage (not shown), thereby activating the power stage in this interval (t8–t10, t11–t12, . . . ), and intermittently sends down-sending data from the antenna S as a high frequency signal STX (down). The mobile station demodulates a received high frequency signal SRx (down) of the STX (down) arriving there during an interval lasting from time t9 to t10 due to propagation delay, and establishes a down-transmission channel.

Note here that, as described above, each of the transmission signals of the up- and down-channels includes a group of sync symbols of several kinds and a plurality of data symbols for transmitting information codes located in a former half of a frame, and a signal non-sending interval located in a latter half of the frame during which no signal is sent.

The apparatus according to the present invention is assumed to conduct transmission between locations which are about 100 Km distant from each other at maximum. Since the radio wave used by the inventive apparatus is in the wavelength of the microwave band and hence travels straight, it only reach about 100 Km on the surface of the earth which is spherical.

Take, for example, the case of the maximum terrestrial transmission of 100 Km, the radio wave experiences the transmission delay of about 330 $\mu S$. In FIG. 3 the up-direction high frequency signal MTX requires the time from t0 to t1 or the maximum of about 330 $\mu S$ to reach the antenna S. Taking this into account, the sum of the sending period of up-direction high frequency signal MTX and sending period of down-direction high frequency signal STX is required to be set to shorter than the frame period t0–t5 by mutual delay times 330 $\mu S \times 2$. This is indicated by the following relationship:

MTX time+STX time=frame period−(delay time at maximum transmission distance)×2

More specifically, in the case of 100 Km maximum transmission, the up- and down-direction sending periods are assigned with one frame period minus 650 to 700 $\mu S$ period which corresponds to 10 to 12 symbol period without regard to the length of the frame period. Note that when the transmission distance is shorter, the MTX time and STX time are assigned with longer time.

The sending high frequency unit (Th) 55 and the RF switchover unit (SWa) 59 of the up-transmission system and a receiving high frequency unit (Rh) 26 of the down-transmission system are controlled in terms of ON/OFF of RF output and switching of RF path up to the sending/receiving antenna M by a sending control unit (Txm) 51. In the same way, a sending high frequency unit (Ths). 58 and the RF switchover unit (SWb) 60 of the down-transmission system and a receiving high frequency unit (Rhm) 27 of the up-transmission system are controlled in terms of ON/OFF of RF output and switching of RF path up to the sending/ receiving antenna S by a receiving control unit (Rxm) 53 of the up-transmission system.

Figure 4:
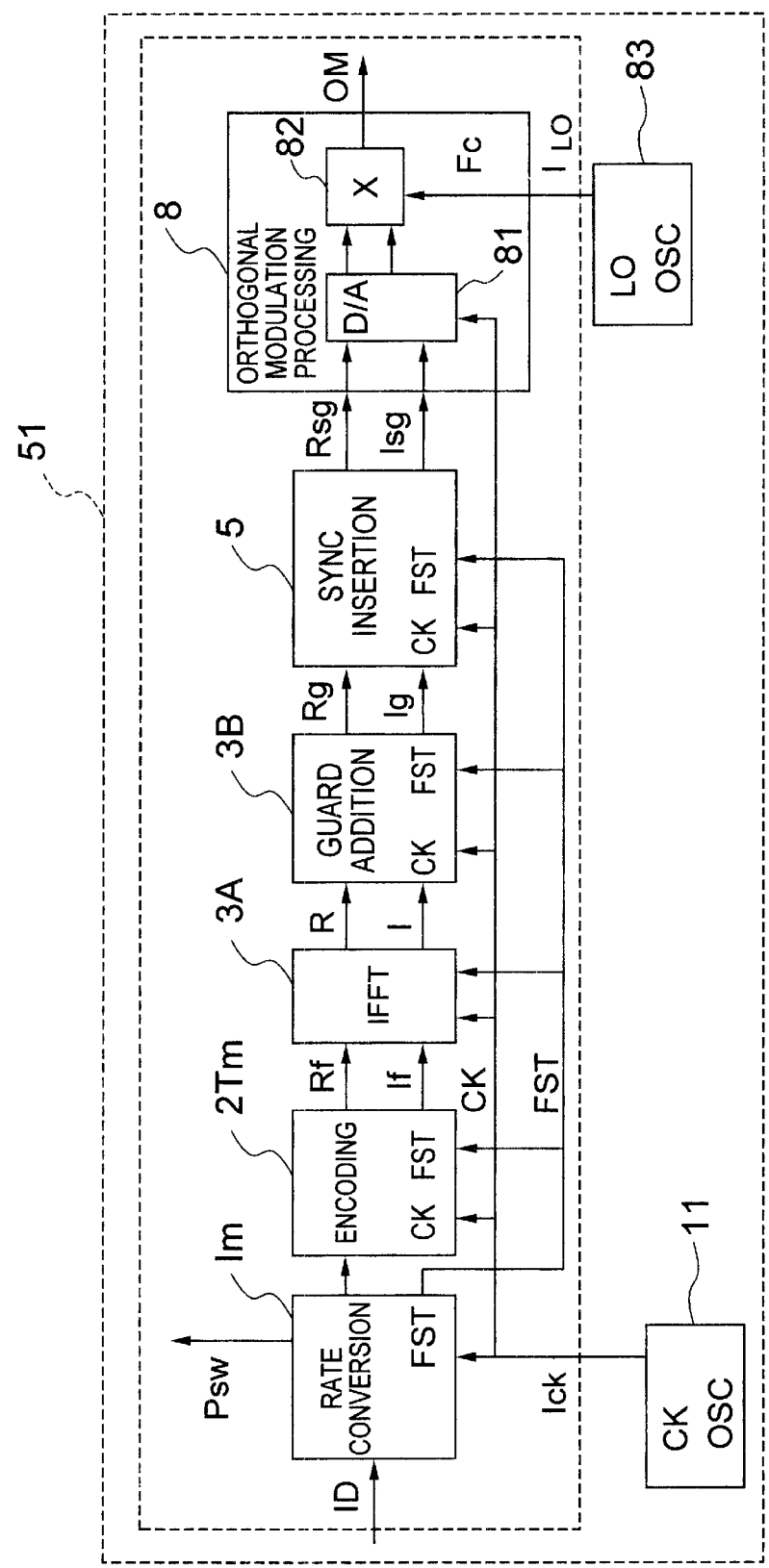
FIG. 4 is a block diagram showing a concrete configuration of a sending control unit of a base station.

FIG. 4 shows the configuration of the sending control unit (Txm) 51 of the mobile station side. The rate conversion unit 1 in the above described sending control unit 21 has been replaced by a rate conversion unit 1m which is capable of outputting a Psw signal (control signal C(m)) and which outputs data in only a former half of the frame period. In addition, the above described encoding unit 2T has been replaced by an encoding unit 2Tm, which operates so as to output data of 400 symbols including synchronizing symbols in only the former half of the frame period formed of 900 symbols, such as in the interval lasting from t0 to t2.

Figure 5:
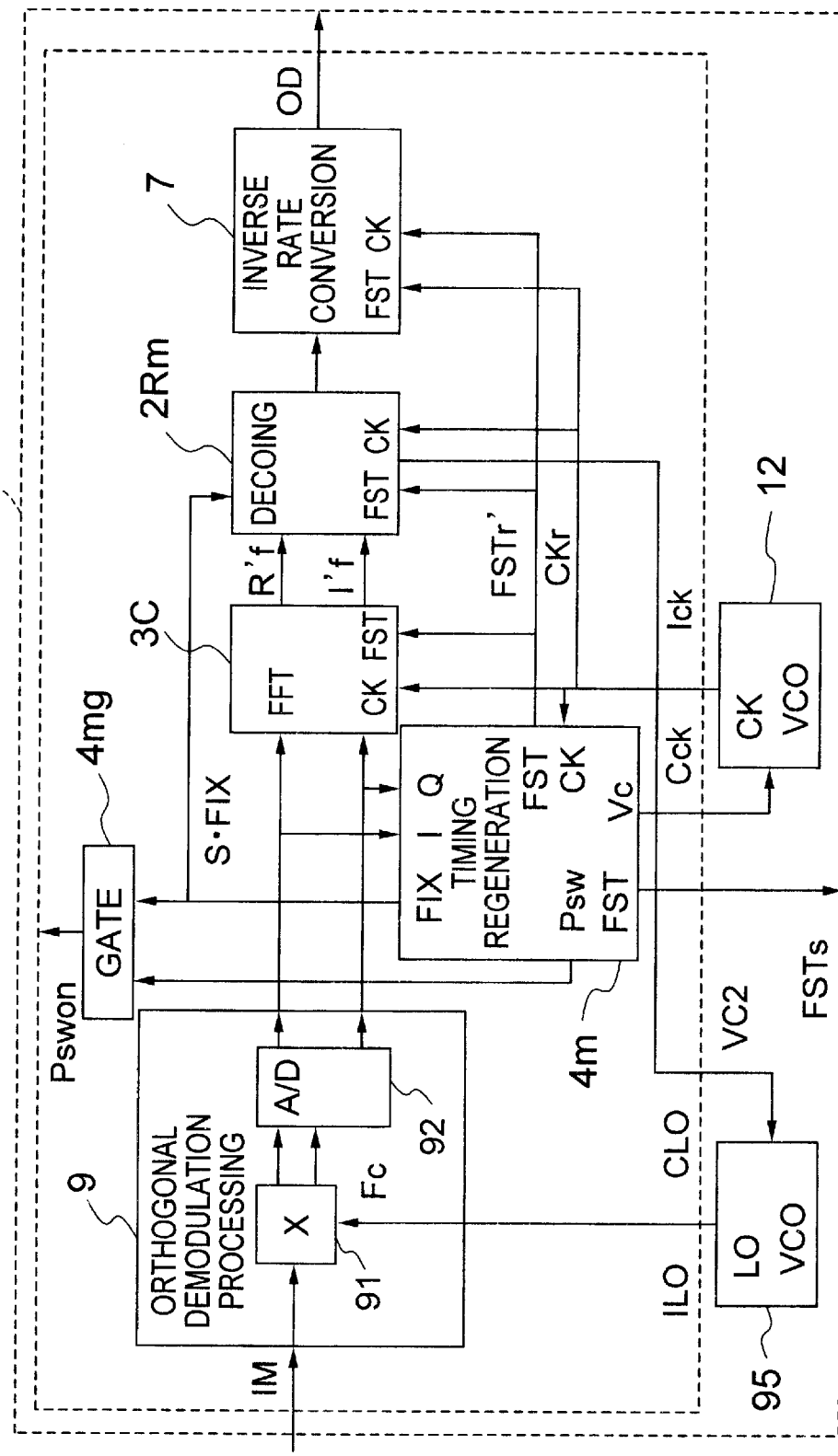
FIG. 5 is a block diagram showing an example of a configuration of a receiving control unit of a base station.

FIG. 5 shows the configuration of the receiving control unit (Rxm) 53 of the base station side. The timing regeneration unit 4 in the above described receiving control unit 23 has been replaced by a timing regeneration unit 4m capable of outputting Psw, FSTr, and S·FIX signals. In addition, the Psw signal and the S·FIX signal are outputted via a NOR gate 4 mg. To be concrete, synchronization in a received signal MRX (up) is detected, and when the S·FIX has become a low level, the Psw is outputted as C(s). In addition, the decoding unit 2R has been replaced by a decoding unit 2Rm having a local VCO control function and functioning to control a voltage controlled local oscillator 95 in the same way.

Figure 6:
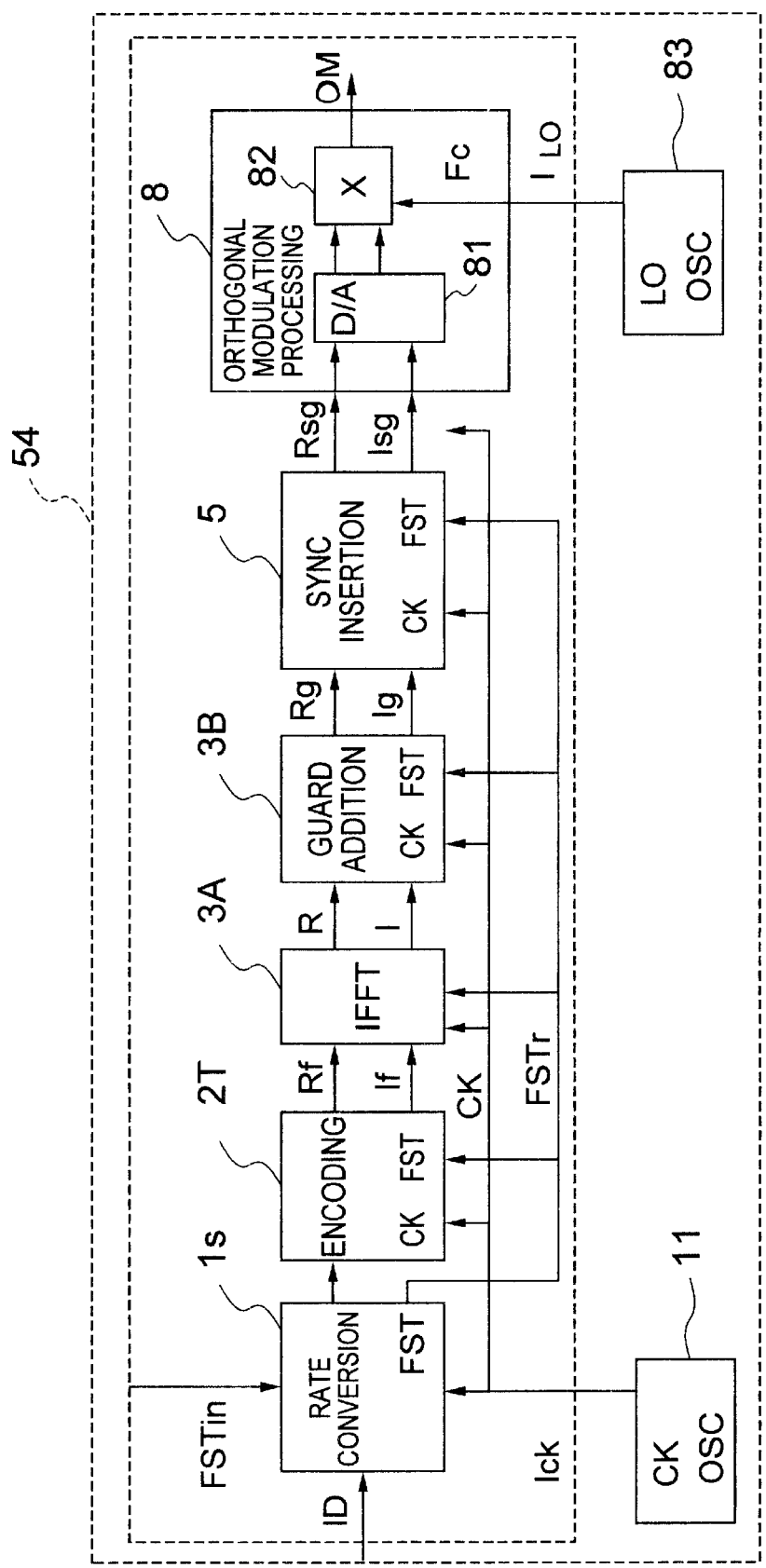
FIG. 6 is a block diagram showing a configuration of a sending control unit of the base station.

FIG. 6 shows the configuration of the sending control unit (Txs) 54 of the base station side. The rate conversion unit 1 of the sending control unit 21 or 24 has been replaced by a rate conversion unit 1s. The rate conversion unit 1s is responsive to an external input FSTin to output FSTr delayed from the FSTin by 1/2 frame, and outputs data in only the former half of the frame period. As a result, the encoding unit 2T functions to output a latter half of the frame period formed of 900 symbols received by the receiving control unit (Rxm) 53, such as data of 400 symbols including sync symbols beginning from the time t8.

Figure 7:
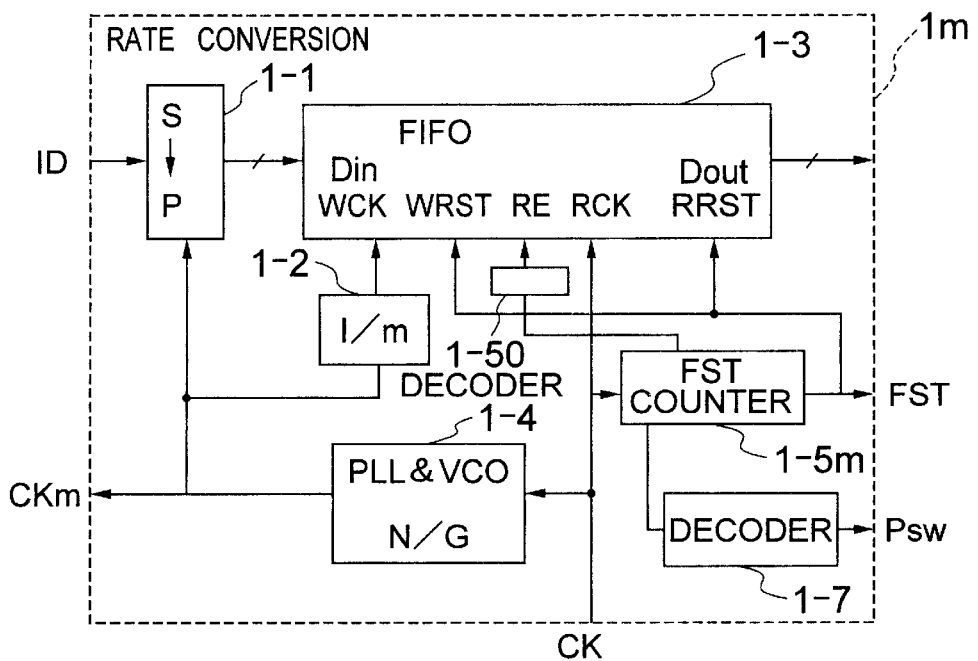
FIG. 7 is a block diagram showing a configuration of a rate conversion unit.

FIG. 7 shows a concrete configuration of the rate conversion unit 1m included in the sending control unit (Txm) 51 on the mobile station side. The FST counter 1-5 of the rate conversion unit 1 of FIG. 16 descried before has been replaced by a FST counter 1-5m which outputs the value of the FST counter as it counts. This counter value is inputted to a decoder 1-7 which generates and outputs a signal Psw which becomes a low level during an interval of the 1st to 400th symbols in a frame having 900 symbols in total.

A decoder 1-50 which is similar in configuration and operation to the decoder 1-7 is provided with the count value output of the FST counter 1-5m as its input. During the same interval, i.e., during the interval of the 1st to 400th symbols in the frame, the decoder 1-50 activates a RE (Read Enable) input of the FIFO 1-3 and causes data to be output. Parameters such as N, G, and CKm shown in FIG. 7 are related as follows:

$$CKm = CK \times N \times (1/G) \times T_{DD}$$

where

N: the number of symbols per frame, which is 544 or 688 under present circumstances and approximately 950 at maximum G: (the number of effective samples+the number of guard samples)×(the number of frame symbols/the number of data symbols)×(1/the number of modulation bits)

$T_{DD}$: ratio of signal sending interval to no signal sending interval

In the present embodiment, the ratio of signal sending interval to no signal sending interval is set to 50%. By setting the $T_{DD}$ to an arbitrary ratio, however, the ratio can be set to a value other than 50%.

Figure 8:
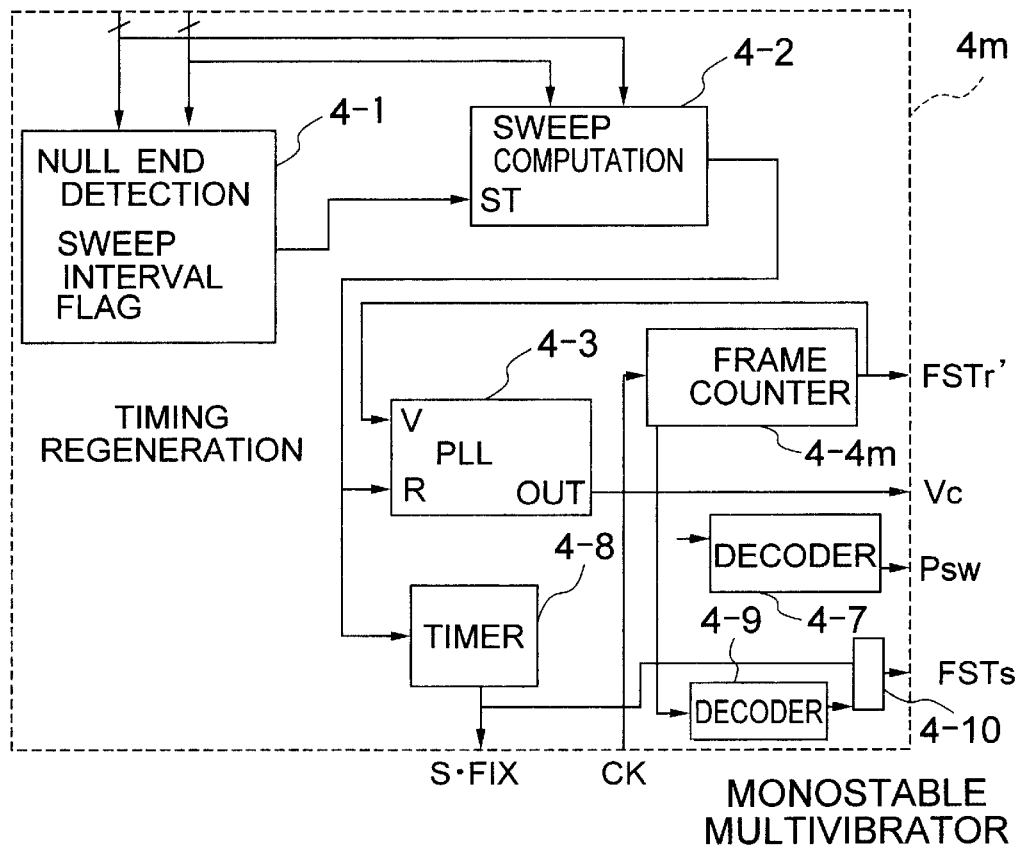
FIG. 8 is a block diagram showing a configuration of a timing control unit.

FIG. 8 shows a concrete configuration of the timing regeneration unit 4m included in the receiving control unit (Rxm) 53 of the mobile station side. The frame counter 4-4 of the timing regenerator 4 of FIG. 21 has been replaced by a frame counter 4-4m which outputs the value of the frame counter as it counts. This counter value is inputted to a decoder 4-7 so that a signal Psw which becomes a low level during an interval of the 450th to 850th symbols in a frame having 900 symbols in total is generated and outputted. The frame counter 4-4m also outputs a pulse FSTr' which becomes a low level in an interval lasting from the 450th to 900th symbols. A coincidence pulse supplied from the SWEEP computation unit 4-2 is inputted to a timer 4-8. The timer 4-8 thus outputs a S·FIX signal which becomes a low level in the case where the coincidence pulse periodically occurs showing the establishment of the receiving operation of the up-channel. The S·FIX signal is further supplied to one input of a monostable multivibrator 4-10. To the other input of the monostable multivibrator 4-10, output of a decoder 4-9 provided with the count value of the frame counter 4-4m as its input is supplied. In the same way as the decoder 1-7 included in the rate conversion unit 1m (FIG. 7), the decoder 4-9 outputs a signal FSTs which becomes a low level during an interval of the 1st to 400th symbols in a frame having 900 symbols. Therefore, the FSTs indicates the end phase of the data symbol interval of each receiving frame after the receiving operation of the up-channel has been established.

Figure 23:
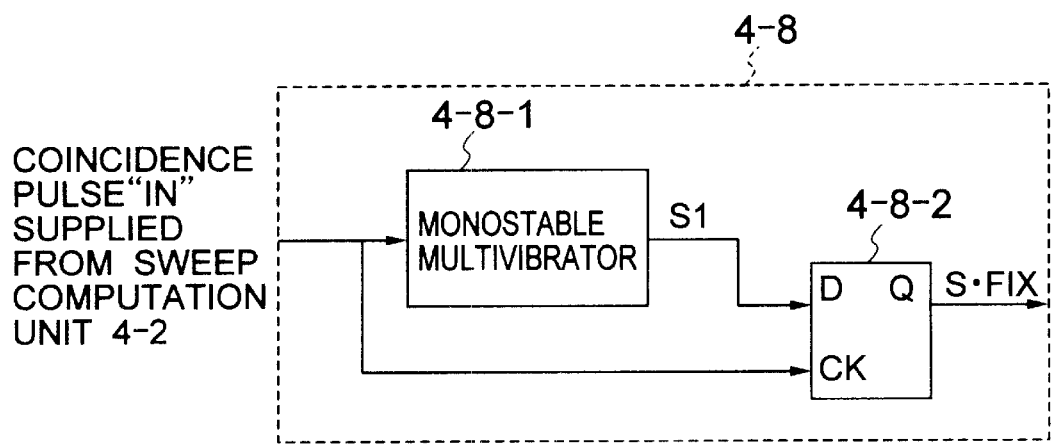
FIGS. 23A and 23B are a block diagram showing an example of a configuration of a timer in the timing control unit of FIG. 8, and a waveform diagram useful for description its operation, respectively.
Figure 23:
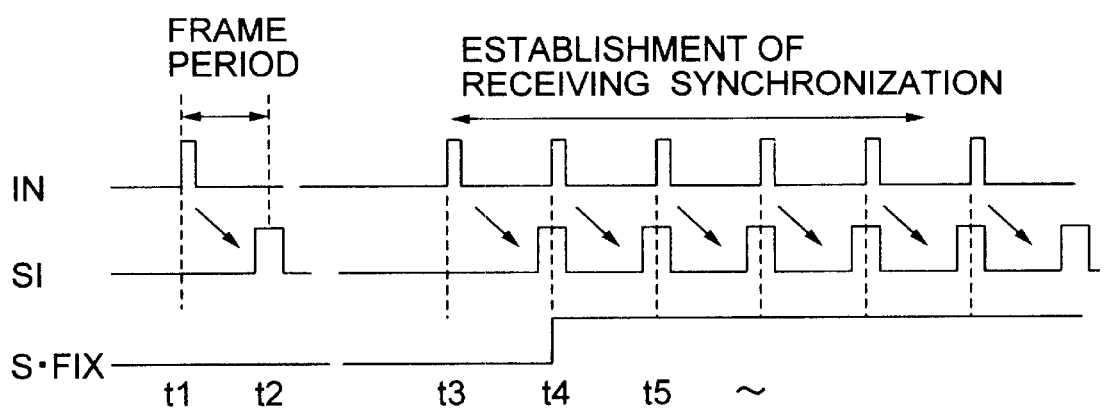

FIGS. 23A and 23B show an configuration example of the timer 4-8, and waveforms for description of its operation, respectively. The establishment of the receiving synchronization in the receiving control unit will now be described by referring to FIGS. 23A and 23B. The coincidence pulse supplied from the SWEEP computation unit 4-2 (input IN) is inputted to a monostable multivibrator 4-8-1. A pulse S1 which becomes a high level only after about one frame period is thus outputted. A D flip-flop 4-8-2 is provided with the pulse S1 at its D terminal, and provided with the input IN at its CK terminal. In synchronism with each rising edge of the input IN, the state of the D terminal is latched.

This operation is shown in FIG. 23B. Before time t3 preceding the establishment of the receiving synchronization, the IN signal appears only rarely and its period does not coincide with the frame at all. Therefore, a S1 signal of time t2 generated by the IN signal of time t1 which has been only rarely generated is not latched. If the IN signal occurs periodically and at frame periods after the time t3, the signal S1 is at its high level around time t4 because of the IN signal at the time t3. By using the IN signal of the time t4 as CK, therefore, the flip-flop 4-8-2 latches the high level H, and outputs the S·FIX. Then, the high level H of the S1 caused around time t5 by the IN of the time t4 is latched again by the IN signal of the time t5. Thereafter, the signal S·FIX maintains its high level H each time the signal IN is inputted at frame periods.

Figure 9:
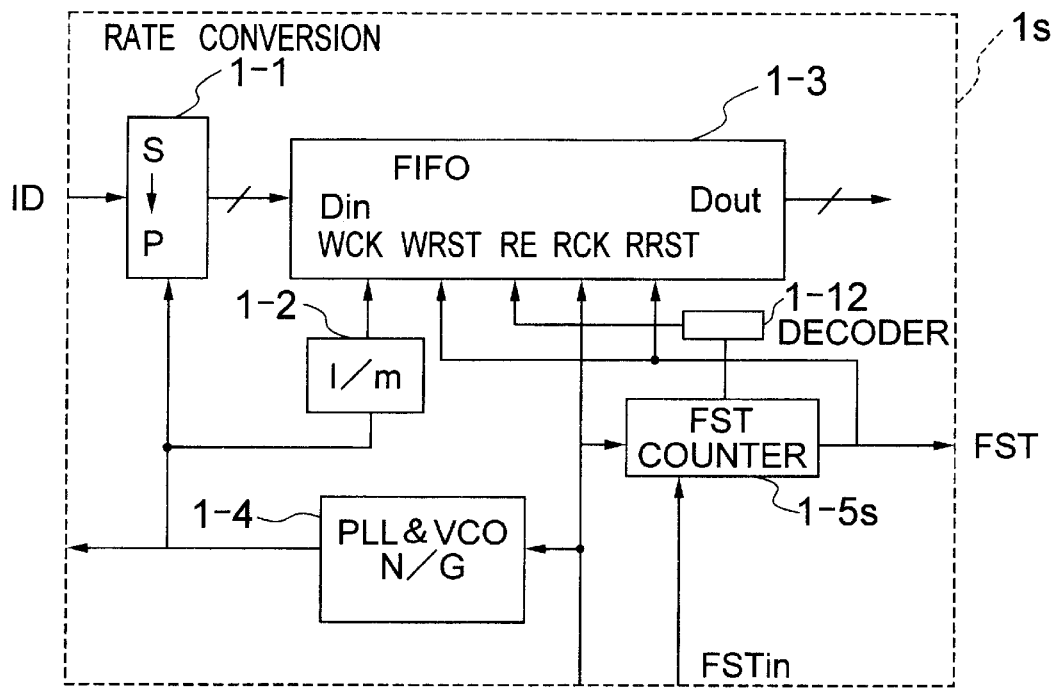
FIG. 9 is a block diagram showing a configuration of a rate conversion unit.

FIG. 9 shows a concrete configuration of the rate conversion unit 1s in the sending control unit (Txs) 54 of the base station side. The FST counter 1-5 of the rate conversion unit 1 of FIG. 16 has been replaced by a FST counter 1-5s which can be reset by an external pulse FSTin. The signal FST is generated and outputted with a phase in accordance with the pulse FSTin. The count value of the FST counter 1-5s is inputted to a decoder 1-12. During the interval of the 1st to 400th symbols in the frame having 900 symbols, the decoder 1-12 activates the RE input of the FIFO 1-3 and causes data to be output.

Figure 10:
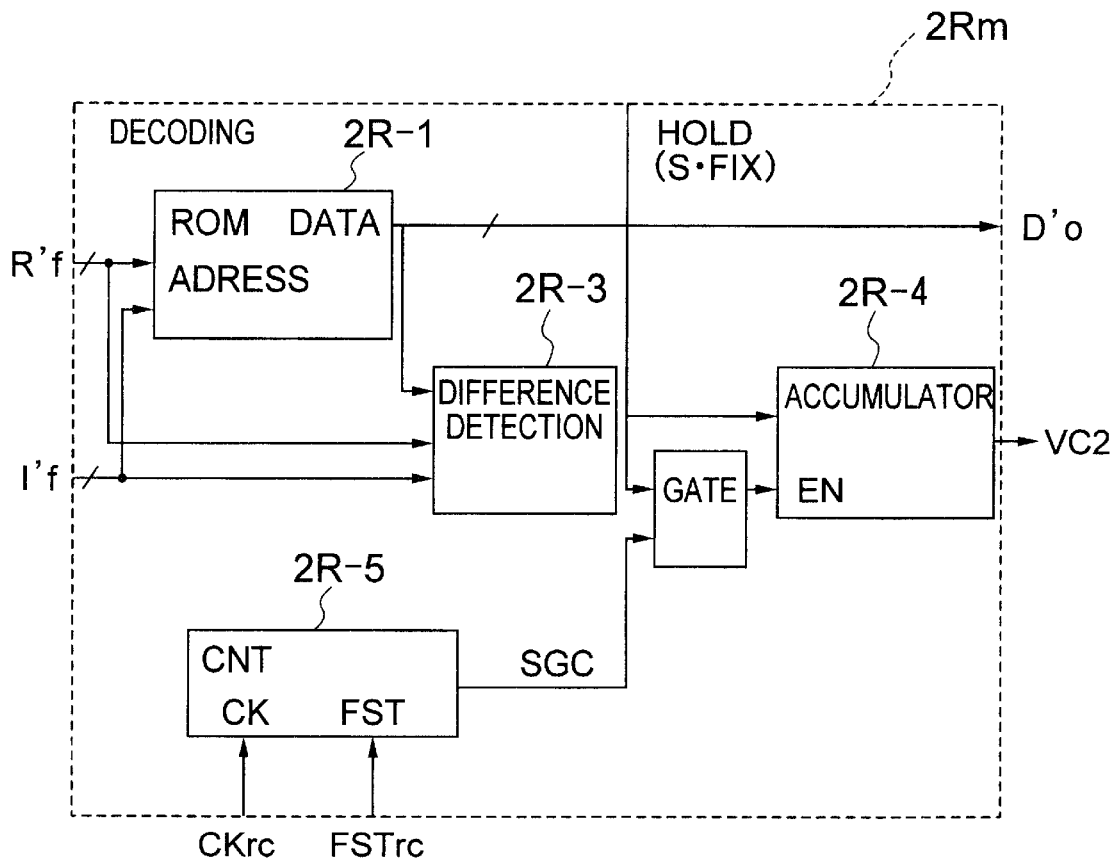
FIG. 10 is a block diagram showing a configuration of a decoding unit.

FIG. 10 shows a configuration example of the decoding unit 2Rm having a holding function in the receiving control unit (Rxm) 53 of the base station side. Inputs R'f and I'f are inputted to address terminals of a ROM 2R-1 and to a difference detector 2R-3. Output of the difference detector 2R-3 is inputted to an accumulator 2R-4. To an EN terminal of the accumulator 2R-4, a SGC signal supplied from a controller 2R-5 and an externally inputted signal S·FIX (hold signal) are inputted via a gate.

The difference detector 2R-3 derives a difference vector between a signal point on the mapping which, according to discrimination by the ROM 2R-1, is supposed to be located there and a signal point of the R'f and I'f inputted to the decoding unit. In response to indication from the SCG signal, the accumulator 2R-4 takes in the difference vector only during the interval of carrier existence in the signal of the band converted in frequency by the FFT processing unit. Using a clock CKr and a FSTr pulse as fererences, a controller (CNT) 2R-5 outputs the signal SGC indicating the data interval to be decoded.

Figure 24:
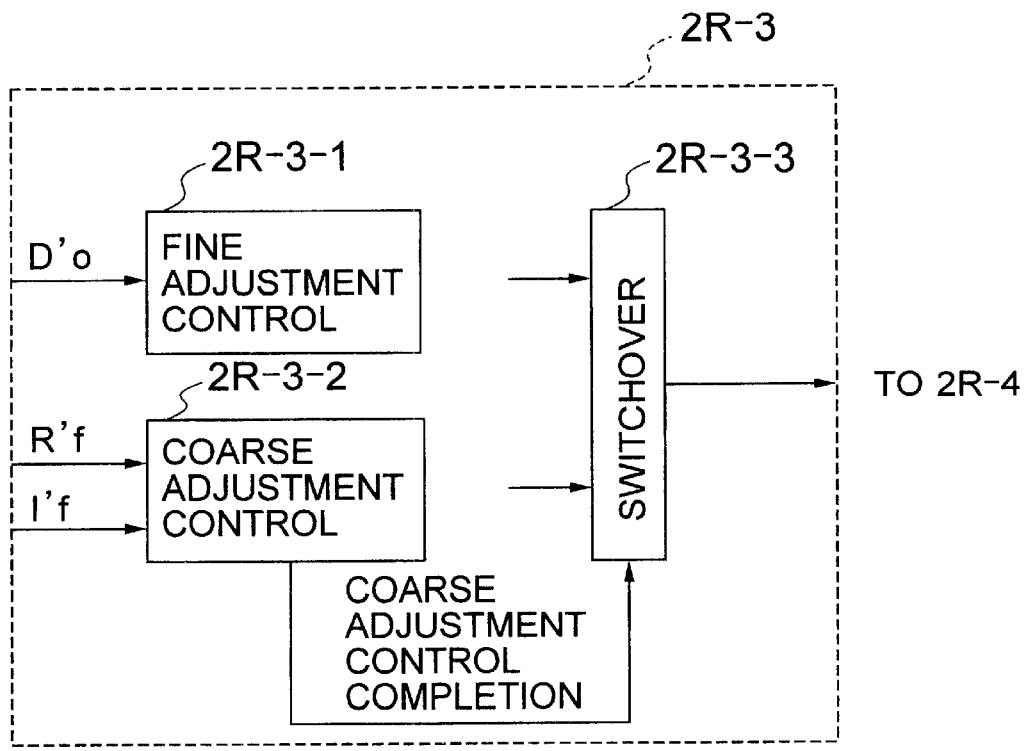
FIG. 24 is a block diagram showing an example of a configuration of a difference detector in the decoder of FIG. 10.

FIG. 24 shows a configuration example of the difference detector 2R-3. The difference detector 2R-3 includes a fine adjustment control unit 2R-3-1 provided with D'o as its input, a coarse adjustment control unit 2R-3-2 provided with the R'f and I'f as its inputs, and a switchover unit 2R-3-3 provided with output of the coarse adjustment control unit and a switchover signal (coarse adjustment completion signal) as its inputs. Using cw in the sync symbols as a reference, the difference detector 2R-3 roughly detects deviation of the local frequency once per frame and outputs a correction value for eliminating the frequency difference. When the deviation has reached in a permitted range, a coarse adjustment completion signal is outputted. After the coarse adjustment has been completed, the fine adjustment control for sensing an abnormal state of the decoded value is started.

Figure 11:
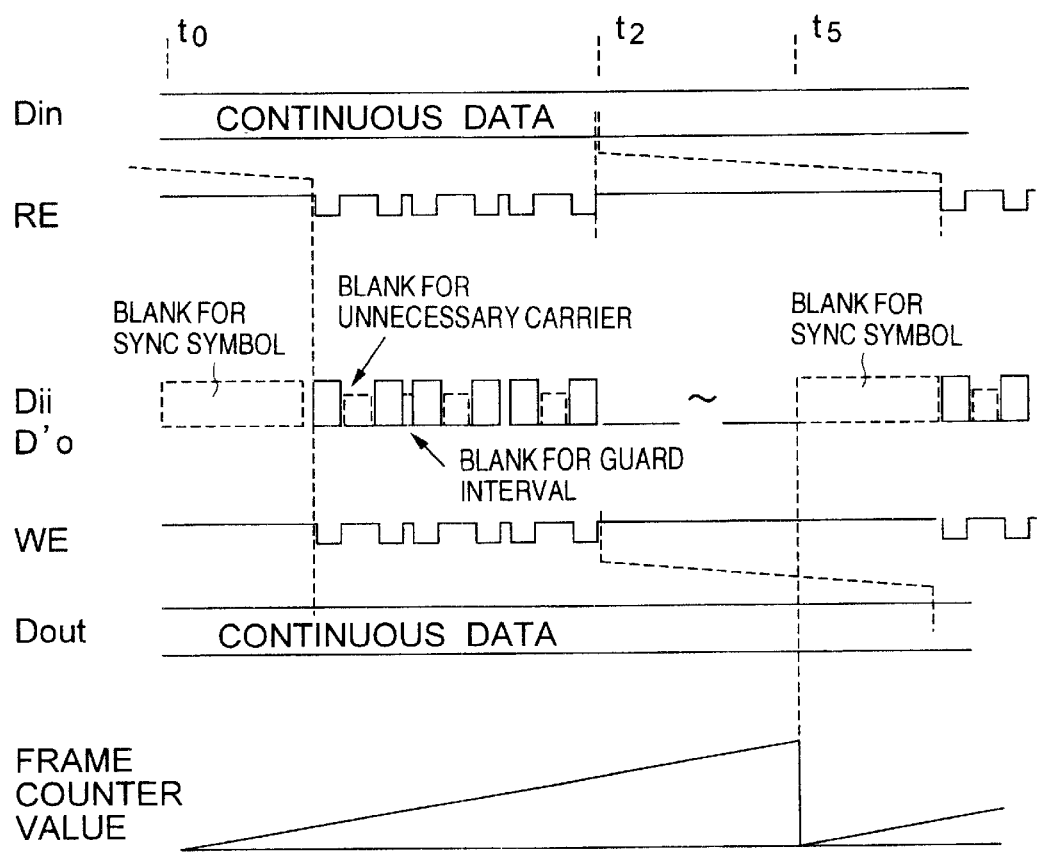
FIG. 11 is a conceptual diagram of a transmission signal generation.

FIG. 11 shows a timing chart of the rate conversion processing and encoding processing on the sending side, and the decoding processing and the inverse rate conversion processing on the receiving side. The rate conversion unit 1m stores data of one frame in the FIFO 1-3 mounted thereon, and outputs the data during the interval $t_0$ to $t_2$ (sending interval).

The sending high frequency unit 55 is so formed as to effect output of a power amplifier of its sending stage (not shown) when a "low" level signal is supplied to its control input terminal.

In the meantime, if there is a difference in clock rate between the sending control unit (Txm) 51 of the mobile station side and the sending control unit (Tsm) 54 of the base station side, then a phase difference occurs in the frame period determined by frequency diving the clock as time elapses, causing disorder in the down-transmission. More specifically, while transmission between fixed locations (transmission stations) involves no change in mutual distance, transmission between a mobile station which is moving and a fixed station causes the mutual distance to be changed. When the distance becomes nearer, the frame period gets shorter. Conversely, the distance becomes further, the frame period gets longer. Accordingly, it is necessary to increase or decrease the clocking frequency correspondingly.

FIG. 2 shows a second configuration of the present invention aiming at coping with this point. The sending control unit 54 of the base station side has been replaced by a sending control unit (Txs) 54b having no clock oscillators. By using the clock CK regenerated by the receiving control unit (Rxm) 53, the rate of the up-direction transmission is made the same as the clock rate of the down-direction transmission. Since both the frame period of the mobile station side and the frame period of the base station side are generated by conducting the same frequency division on the same clock, frame phase deviation is essentially not caused.

In the same way, the receiving control unit (Rxs) 52b of the mobile station side has no clock oscillators. By using the clock CK of the sending control unit (Txm) 51, the rate of the up-direction is made the same as the transmission clock of the down direction. Since other portions of FIG. 2 are the same as those of FIG. 1, description will be omitted.

Figure 25:
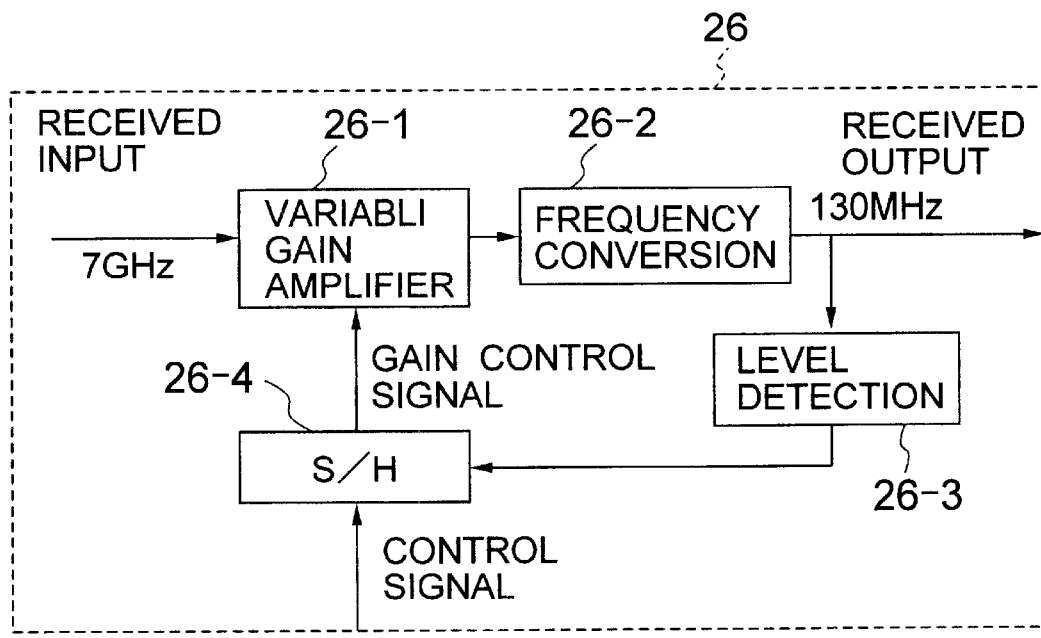
FIG. 25 is a block diagram showing an example of a configuration of a receiving high frequency unit in the transmission system of FIG. 12.

FIG. 25 shows a configuration example of the receiving high frequency unit 26. The receiving high frequency unit 26 includes a variable gain amplifier 26-1 which can be controlled in gain, a frequency conversion unit 26-2 for converting a frequency in a 7 GHz band to that in a 130 MHz band, a level detector for detecting an output level in the 130 MHz band, and a S/H (sample and hold) 26-4 for holding the input signal value and outputting the input value as it is, in response to a control signal.

During the period when there is no received input, the control signal keeps the S/H 26-4 in the holding mode and prevents the variable gain amplifier 26-1 from increasing its gain unnecessarily.

Figure 26:
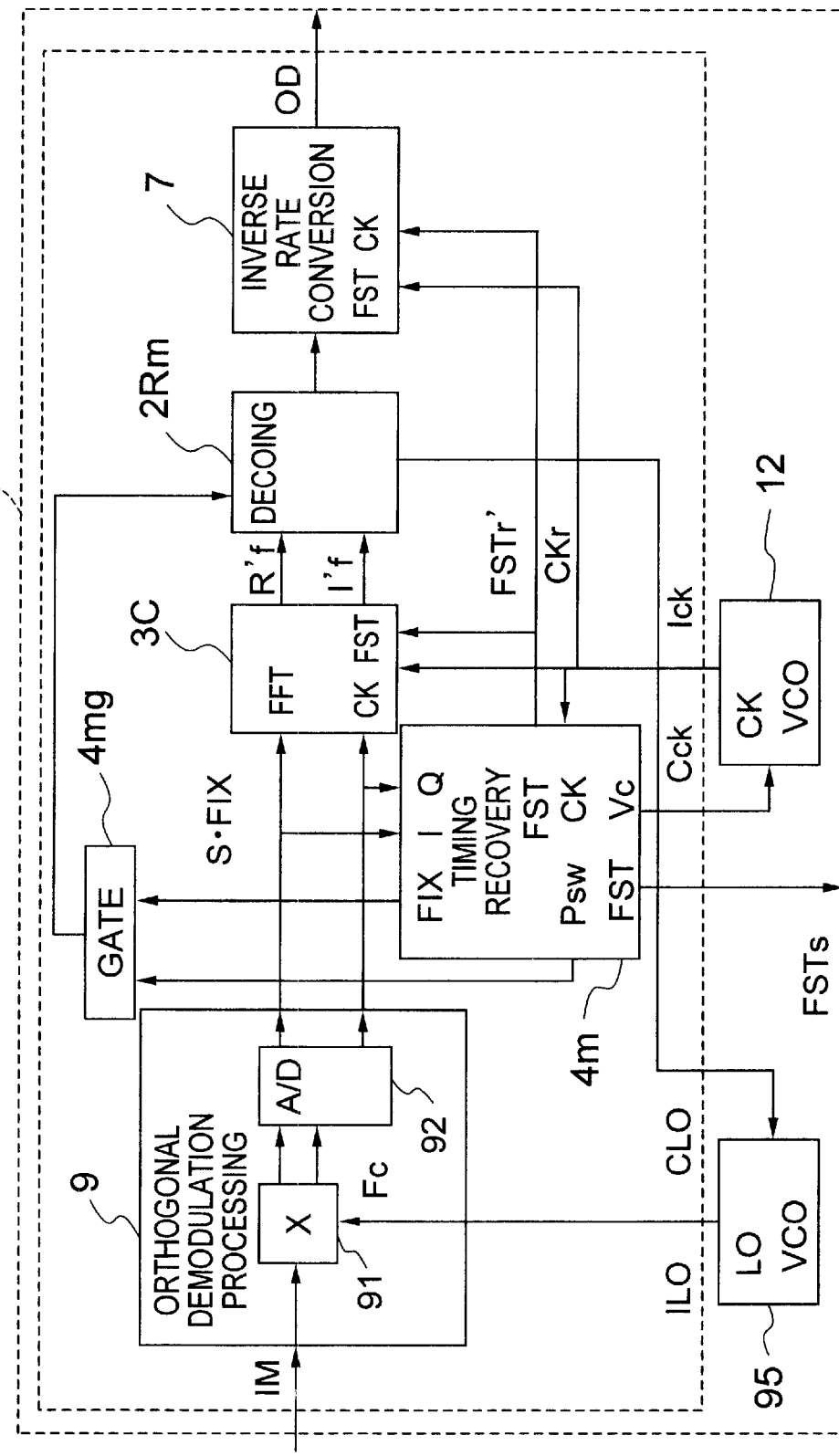
FIG. 26 is a block diagram showing an example of a configuration of a receiving high frequency unit.

FIG. 26 shows a configuration example of the receiving control unit (Rxs) 53 of the mobile station side in the down-transmission system of the embodiment of FIG. 1. Unlike the receiving control unit of the base station side of FIG. 5, the output of the gate 4 mg is supplied to the decoding unit 2Rm. Since other components are the same as those of FIG. 5, however, description will be omitted.

Figure 27:
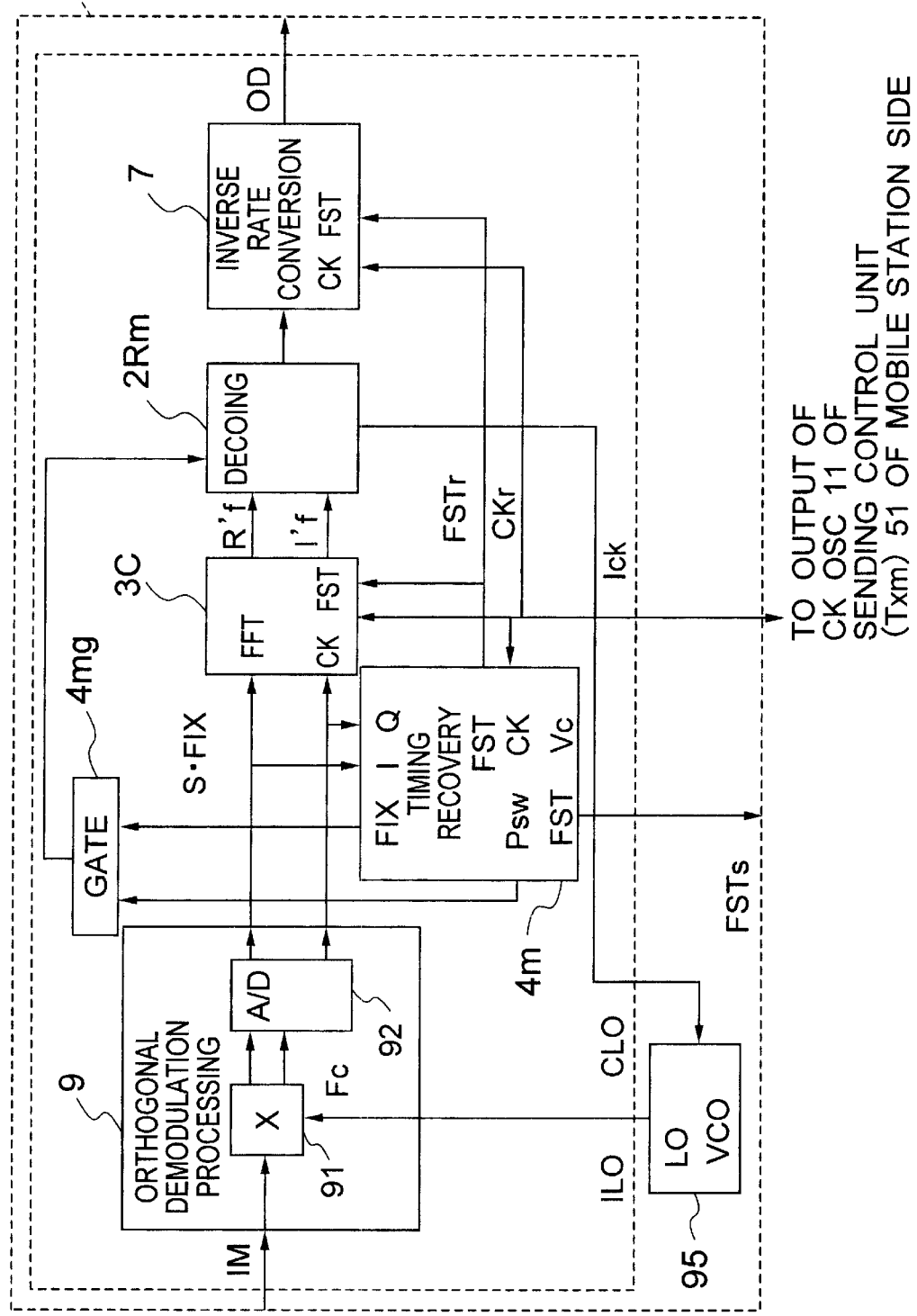
FIG. 27 is a block diagram showing an example of a receiving control unit of a mobile station.
Figure 28:
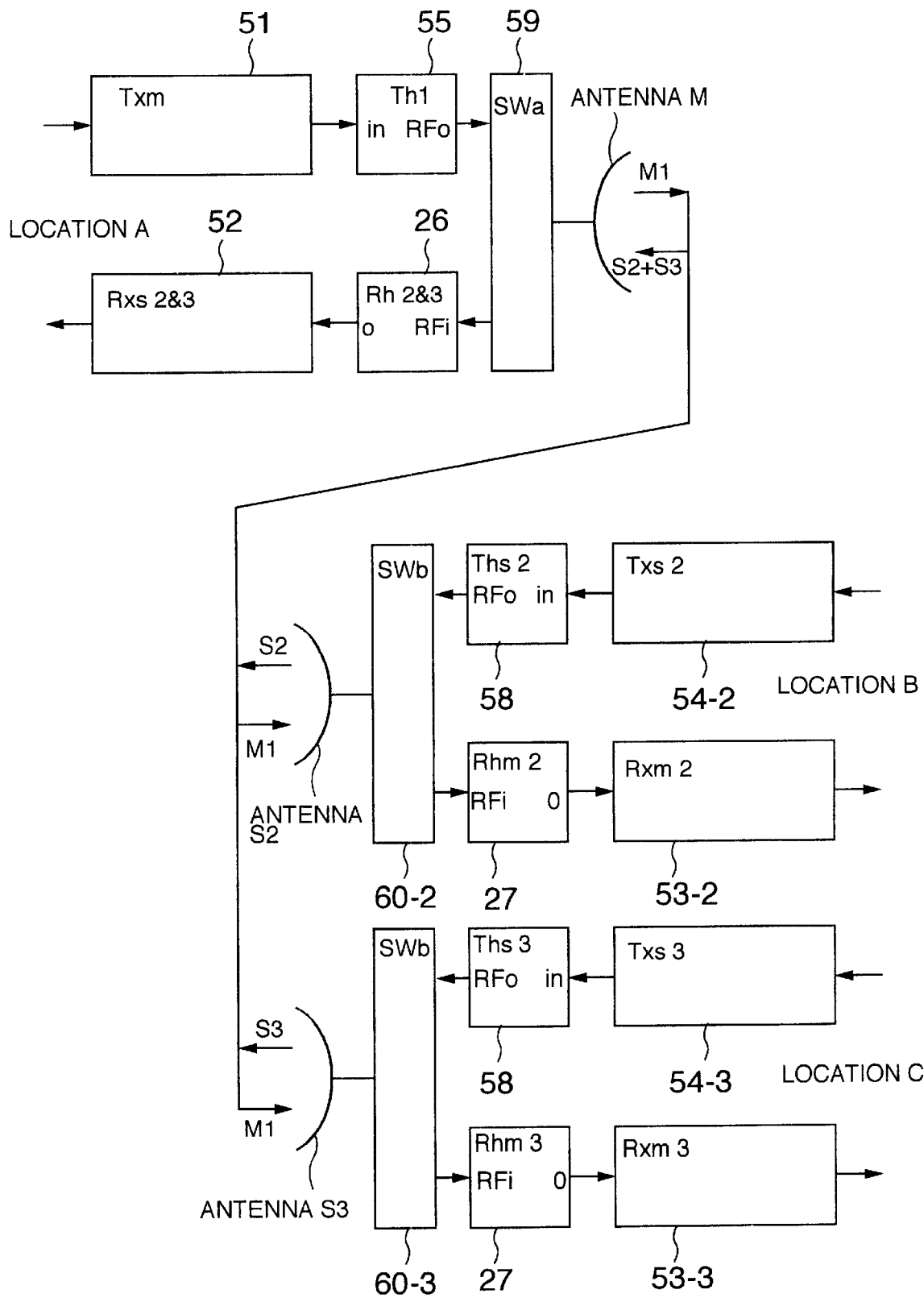
FIG. 28 is a block diagram of a bi-directional transmission system according to a further embodiment of the invention.
Figure 29:
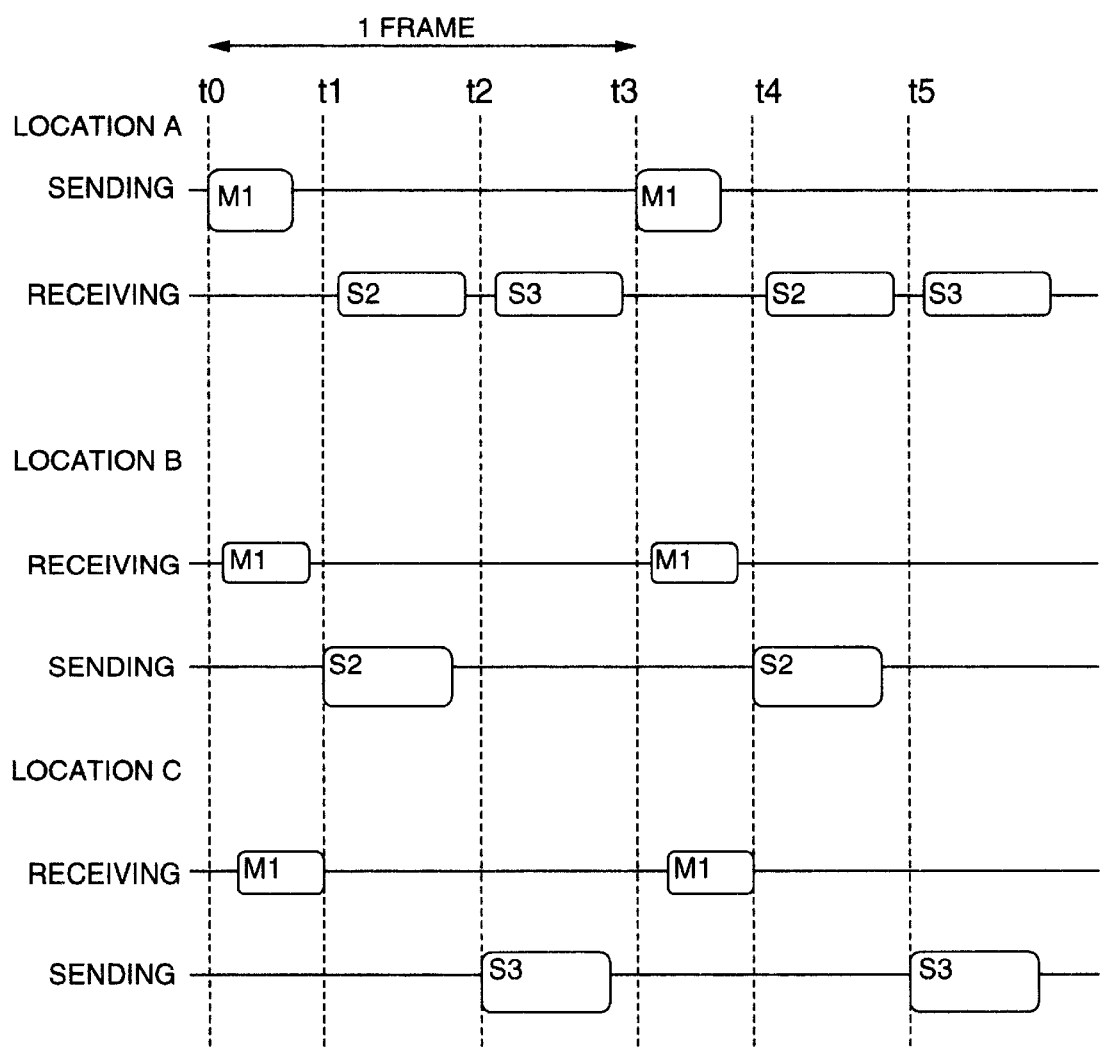
FIG. 29 is a time chart useful for explaining the operation of the system shown in FIG. 28.

FIG. 27 shows a configuration example of the receiving control unit (Rxs) 53 of the mobile station side in the down-transmission system of the embodiment of FIG. 2. Unlike the receiving control unit of the base station side of FIG. 5, the output of the gate 4 mg is supplied to the decoding unit 2Rm. In addition, the output of the clock oscillator 11 of the sending control unit (Txm) 51 of the mobile station side is used instead of a voltage controlled clock oscillation circuit 12 used in FIG. 26. Since other components are the same as those of FIG. 5, however, description will be omitted.

While two bands are required in the bi-directional transmission system of the conventional configuration, the above described embodiments makes possible bi-directional transmission using one band although the amount of the transmitted data is reduced, as heretofore described. Limited radio waves can be used effectively.

While the invention has been particularly described and shown with reference to the presently preferred embodiments thereof, it will be understood by those skilled in the art that various changes in form and details and omissions may be made therein without departing from the spirit and scope of the invention. For example, it is evident that the RF switchover units 59 and 60 become unnecessary in each transmission station, if the sending/receiving antenna shared in the above described embodiments is separated into two antennas, i.e., an antenna for sending and an antenna for receiving in the above described embodiments. This also falls in the scope of the invention.

What is claimed is:

1. A bi-directional digital transmission system for transmitting digital transmission signals having a frame configuration modulated by an orthogonal frequency division multiplex modulation scheme, said bi-directional digital transmission system comprising:

a first transmission station including a first sending unit, a first receiving unit, a first switchover unit connected to an output of said first sending unit and an input of said first receiving unit, selection of either the output of said first sending unit or the input of said first receiving unit being controlled by said first sending unit, and a first sending/receiving path connected to the selected output of said first switchover unit; and a second transmission station including a second sending unit, a second receiving unit, a second switchover unit connected to an output of said second sending unit and an input of said second receiving unit, selection of either the output of said second sending unit or the input of said second receiving unit being controlled by said second receiving unit, and a second sending/receiving path connected to the selected output of said second switchover unit, wherein in said first transmission station said first sending unit converts first continuous data to an up-direction intermittent transmission signal and sends said up-direction intermittent transmission signal from said first sending/receiving path via said first switchover unit during a first sending period, and in said second transmission station said second receiving unit restores the original first continuous data from said up-direction intermittent transmission signal received by said second sending/receiving path and supplied via said second switchover unit, and in said second transmission station said second sending unit converts second continuous data to a down-direction intermittent transmission signal and sends said down-direction intermittent transmission signal from said second sending/receiving path via said second switchover unit during a second sending period, and in said first transmission station said first receiving unit restores the original continuous data from the down-direction intermittent transmission signal received by said first sending/receiving path and supplied via said first switchover unit, said first and second sending periods appear alternately and repetitively.

2. A bi-directional digital transmission system according to claim 1, wherein said up-direction intermittent transmission signal and said down-direction intermittent transmission signal use same transmission band.

3. A bi-directional digital transmission system according to claim 1, wherein said second receiving unit of said second transmission station includes a circuit for recovering a clock from said received up-direction intermittent transmission signal, and a data transmission rate of said second sending unit of said second transmission station is set based on said recovered clock.

4. A bi-directional digital transmission method for sending/receiving digital transmission signals having a frame configuration modulated by an orthogonal frequency division multiplex modulation scheme between a first transmission station and a second transmission station, said bi-directional transmission method comprising the steps of:

controlling the first and second transmission stations so as to alternately produce a first sending period to be used by the first transmission station for transmission and a second sending period to be used by the second transmission station for transmission, the first sending period and subsequent second sending period constituting one frame;

converting first continuous data to an up-direction intermittent transmission signal of a frame configuration having a sending section and a non-sending section appearing alternately and further orthogonal-frequency-division multiplex modulating the up-direction intermittent transmission signal in a first sending unit in the first transmission station so as to send digital information in the sending section from a first antenna via a first switchover unit during the first sending period;

receiving the up-direction intermittent transmission signal by a second antenna of the second transmission station;

supplying the receiving up-direction intermittent transmission signal to a second receiving unit in the second transmission station via a second switchover in the second transmission station and restoring the original first continuous data;

converting second continuous data to a down-direction intermittent transmission signal of a frame configuration having a sending section and a non-sending section appearing alternately and further orthogonal-frequency-division-multiplex modulating the down-direction intermittent transmission signal by a second sending unit in the second transmission station so as to send digital information in the sending section from a second antenna via a second switchover unit during the second sending period;

receiving the down-direction intermittent transmission signal by the first antenna in the first transmission station; and supplying the received down-direction intermittent transmission signal to a first receiving unit in the first transmission station via the first switchover unit and restoring the original second continuous data from the received down-direction intermittent transmission signal.

5. A bi-directional digital transmission method according to claim 4, wherein said up-direction intermittent transmission signal and said down-direction intermittent transmission signal use same transmission band.

6. A bi-directional digital transmission method according to claim 4, wherein said second receiving unit of said second transmission station recovers a clock from said received up-direction intermittent transmission signal, and a data transmission rate of the second sending unit of said second transmission station is set based on said recovered clock.

7. A bi-directional digital transmission system using an orthogonal frequency division multiplex modulation scheme for sending and receiving digital transmission signals each having a frame configuration, each frame including a sync symbol interval and a data symbol interval, said bi-directional digital transmission system comprising:

a first transmission station, said first transmission station including a first sending and receiving antenna, a first sending/receiving switchover unit connected to said first sending and receiving antenna, and an up-system sending device and a down-system receiving device connected to said first sending/receiving switchover unit, said up-system sending device including a sending control unit, a clock circuit connected to said sending control unit, and a sending high frequency unit having an input connected to output of said sending control unit and an output connected to said first sending/receiving switchover unit, said sending control unit including a converter for converting continuous data to be sent to an up-intermittent transmission signal having a frame configuration, each frame including a sending section and a non-sending section, an orthogonal modulation processing circuit of said up-intermittent transmission signal, and a circuit for generating a signal indicating a sending section or a non-sending section of said up-intermittent transmission signal, said sending high frequency unit including a circuit for interrupting a high frequency sending output during said non-sending section, said down-system receiving device including a receiving high frequency unit connected to said switchover unit, a receiving control unit, and a clock circuit connected to said receiving control unit, said receiving control unit including an orthogonal demodulation processing unit for received down-intermittent transmission signal, connected to said receiving high frequency unit, and a demodulation conversion circuit for decoding the demodulated down-intermittent transmission signal and converting the decoded down-intermittent transmission signal to continuous data, said first sending/receiving switchover unit being controlled so as to select either said up-system sending device or said down-system receiving device depending upon whether a section is a sending section or non-sending section every frame; and a second transmission station, said second transmission station including a second sending and receiving antenna, a second sending/receiving switchover unit connected to said second sending and receiving antenna, and an up-system receiving device and a down-system sending device connected to said second sending/receiving switchover unit, said up-system receiving device including a receiving high frequency unit connected to said second sending/receiving switchover unit, and a receiving control unit connected to said receiving high frequency unit, said receiving control unit including an orthogonal demodulation processing unit for the received up-intermittent transmission signal sent from said first transmission station, a decoding conversion circuit for decoding the demodulated up-intermittent transmission signal and converting the decoded up-intermittent transmission signal to continuous data, a circuit for outputting a signal indicating an end phase of a data symbol interval of each frame of said up-intermittent transmission signal and a circuit for generating a signal indicating a data symbol interval of each frame of said up-intermittent transmission signal from said first transmission station, said down-system sending device including a sending control unit, and a sending high frequency unit having an input connected to output of said sending control unit and having an output connected to said switchover unit, said sending control unit including a converter for converting continuous data to be sent to a down-intermittent transmission signal having frames each formed of a sending section and a non-sending section in response to said end phase signal, and an orthogonal modulation processing circuit for said down-intermittent transmission signal, said sending high frequency unit including a circuit for interrupting a high frequency sending output during said non-sending section in response to said signal indicating the data symbol interval generated by said receiving control unit of said second transmission station.

8. A bi-directional digital transmission system according to claim 7, wherein said down-system sending device of said second transmission station comprises a clock oscillator connected to said down-system sending control unit.

9. A bi-directional digital transmission system according to claim 7, wherein said sending control unit of said down-system sending device of said second transmission station uses output of said clock circuit of said up-system receiving device of said second transmission station as a clock.

10. A bi-directional digital transmission system according to claim 7, wherein said down-system receiving device of said first transmission station has a clock oscillator connected to said receiving control unit of said down-system.

11. A bi-directional digital transmission system according to claim 7, wherein said receiving control unit of said down-system receiving device of said first transmission station includes output of said clock circuit of said up-system sending device of said first transmission station as a clock.

12. A bi-directional digital transmission system according to claim 7, the receiving control unit of the up-system receiving device includes a circuit for determining whether receiving operation of the up-intermittent transmission signal from said first transmission station is established, and in response to the establishment of the receiving operation, said circuit for outputting a signal indicating an end of a data symbol interval of each frame of said up-intermittent transmission signal outputs the signal indicating an end of a data symbol interval of each frame of said up-intermittent transmission signal.

13. A bi-directional digital transmission system according to claim 7, wherein the receiving high frequency unit of at least one of said first and second transmission stations comprises a variable gain amplifier for receiving a received signal supplied from a corresponding sending and receiving antenna as an input thereof, and a gain control loop, and said variable gain amplifier is controlled so as to keep its gain low while there is no received input.

14. A bi-directional digital transmission method for sending/receiving digital transmission signals having a frame configuration modulated by an orthogonal frequency division multiplex modulation scheme between a first and second transmission stations, comprising the steps of:

controlling said first and second transmission stations so as to alternately produce a first sending period to be used by the first transmission station for transmission and a second sending period to be used by the second transmission station for transmission, the first sending period and subsequent second sending period constituting one frame;

converting first continuous data to a up-direction intermittent transmission signal of a frame configuration having a sending section and a non-sending section appearing alternately and further orthogonal-frequency-division-multiplex-modulating the up-direction intermittent transmission signal so as to send digital information in the sending section from the first transmission station during the first sending period;

converting second continuous data to a down-direction intermittent transmission signal of a frame configuration having a sending section and a non-sending section appearing alternately and further orthogonalfrequency-division-multiplex modulating the down-direction intermittent transmission signal so as to send digital information in the sending section from the second transmission station during the second sending period;

receiving the digital information from the first transmission station by the second transmission station and restoring the original first continuous data;

receiving the digital information from the first transmission station by the second transmission station and restoring the original first continuous data; and receiving the digital information from the second transmission station by the first transmission station and restoring the original second continuous data.

15. A bi-directional digital transmission method according to claim 4, wherein when starting bi-directional transmission between the first and second transmission stations, the second receiving unit in the second transmission station determines whether receiving operation of the up-direction intermittent transmission signal in the second receiving unit is established, and upon establishment of the receiving operation, the second sending unit in the second transmission station starts to send the down-direction intermittent transmission signal.

16. A bi-directional digital transmission system according to claim 12, wherein said circuit for determining whether receiving operation is established comprises a circuit for periodically determining whether sync recovery has been obtained from the up-intermittent transmission signal received from said first transmission station.

* * * * *